US012618942B2

(12) United States Patent
Fernando et al.

(10) Patent No.: US 12,618,942 B2
(45) Date of Patent: May 5, 2026

(54) JAMMER DETECTION

(71) Applicant: Qualcomm Incorporated, San Diego, CA (US)

(72) Inventors: Udara Fernando, San Diego, CA (US); Ajay Devadatta Kanetkar, San Diego, CA (US); Shrenik Patel, San Diego, CA (US); Kyle Alexander Douglas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 18/340,356

(22) Filed: Jun. 23, 2023

(65) Prior Publication Data

US 2024/0426977 A1 Dec. 26, 2024

(51) Int. Cl.
*G01S 7/36* (2006.01)
*H04L 5/00* (2006.01)

(52) U.S. Cl.
CPC .............. *G01S 7/36* (2013.01); *H04L 5/0062* (2013.01)

(58) Field of Classification Search
CPC ..... G01S 7/36; H04L 5/0062; H04B 7/15542; H04B 1/1027
See application file for complete search history.

(56) References Cited

U.S. PATENT DOCUMENTS

| 5,339,084 A | 8/1994 | Watanabe et al. |
| 11,320,517 B2 * | 5/2022 | Rimini ................... G01S 7/411 |

| 2006/0291540 A1 * | 12/2006 | Lee .......................... H04B 1/71 |
| | | 375/147 |
| 2007/0037572 A1 * | 2/2007 | Nanba .................. H04B 1/1027 |
| | | 455/426.2 |
| 2009/0291644 A1 * | 11/2009 | Suwa ................... H04B 1/1027 |
| | | 455/77 |
| 2010/0265116 A1 | 10/2010 | Kasperkovitz et al. |
| 2010/0285769 A1 * | 11/2010 | Conroy ................. H04B 1/406 |
| | | 455/313 |

(Continued)

OTHER PUBLICATIONS

Partial International Search Report—PCT/US2024/032843—ISA/EPO—Sep. 26, 2024.

(Continued)

*Primary Examiner* — William Kelleher
*Assistant Examiner* — Kenneth W Good
(74) *Attorney, Agent, or Firm* — Smith Tempel Blaha LLC

(57) ABSTRACT

An apparatus is disclosed for jammer detection. In example aspects, the apparatus includes a wireless transceiver configured to be connected to one or more antennas. The wireless transceiver is configured to translate a received signal from a first frequency to a second frequency using a reference signal to produce a translated received signal, with the reference signal including at least one frequency having an association with one or more targeted frequencies of a potential jamming signal. The wireless transceiver is also configured to convert at least a version of the translated received signal in the analog domain into a converted received signal in the digital domain. The wireless transceiver is further configured to detect that the converted received signal comprises a jamming signal based on the association and using at least one threshold and determine a jamming frequency of the jamming signal based on the frequency of the reference signal.

30 Claims, 11 Drawing Sheets

(56)         References Cited

U.S. PATENT DOCUMENTS

| | | | | |
|---|---|---|---|---|
| 2014/0220920 | A1* | 8/2014 | Fernando | H04W 52/0245 |
| | | | | 455/226.2 |
| 2016/0127033 | A1* | 5/2016 | Petrovic | H04B 1/0007 |
| | | | | 455/12.1 |
| 2016/0182271 | A1* | 6/2016 | Chance | H04B 1/28 |
| | | | | 375/344 |
| 2016/0248471 | A1* | 8/2016 | Tomisawa | H04B 1/48 |
| 2020/0088838 | A1* | 3/2020 | Melzer | G01S 7/352 |
| 2020/0367257 | A1* | 11/2020 | Hormis | H04B 7/155 |
| 2022/0075020 | A1* | 3/2022 | Mani | G01S 7/023 |
| 2022/0365169 | A1* | 11/2022 | Lefevre | G01S 7/35 |

OTHER PUBLICATIONS

International Search Report and Written Opinion—PCT/US2024/032843—ISA/EPO—Dec. 9, 2024.

* cited by examiner

1100

JAMMER DETECTION

TECHNICAL FIELD

This disclosure relates generally to wireless transceivers and, more specifically, to detecting a jamming signal.

BACKGROUND

Electronic devices include traditional computing devices such as desktop computers, notebook computers, smartphones, wearable devices like a smartwatch, internet servers, and so forth. Electronic devices also include other types of computing devices such as personal voice assistants (e.g., smart speakers), wireless access points or routers, thermostats and other automated controllers, robotics, automotive electronics, devices embedded in other machines like refrigerators and industrial tools, Internet of Things (IoT) devices, medical devices, and so forth. These various electronic devices provide services relating to productivity, communication, social interaction, security, health and safety, remote management, entertainment, transportation, and information dissemination. Thus, electronic devices play crucial roles in modern society.

Many of the services provided by electronic devices in today's interconnected world depend at least partly on electronic communications. Electronic communications can include, for example, those exchanged between two or more electronic devices using wireless or wired signals that are transmitted over one or more networks, such as the Internet, a Wi-Fi® network, or a cellular network. Electronic communications can therefore include wireless or wired transmissions and receptions. To transmit and receive communications, an electronic device can use a transceiver, such as a wireless transceiver that is designed for wireless communications.

Electronic communications can therefore be realized by propagating signals between two wireless transceivers at two different electronic devices. For example, using a wireless transmitter, a smartphone can transmit a wireless signal to a base station over the air as part of an uplink communication to support mobile services. Using a wireless receiver, the smartphone can receive a wireless signal that is transmitted from the base station via the air medium as part of a downlink communication to enable mobile services. With a smartphone, mobile services can include making voice and video calls, participating in social media interactions, sending messages, watching movies, sharing videos, and performing searches. Other mobile services can include using map information or navigational instructions, finding friends, engaging in location-based services generally, transferring money, obtaining another service like a car ride, and so forth.

Many of these mobile services depend at least partly on the transmission or reception of wireless signals between two or more electronic devices. Consequently, researchers, electrical engineers, and designers of electronic devices strive to develop wireless transceivers that can use wireless signals effectively to provide these and other mobile services.

SUMMARY

A computing device with a transceiver may receive a jamming signal that interferes with desired performance. If a jamming signal is detected, however, the computing device can act to avoid the jamming signal or at least reduce the negative effects thereof. This document describes apparatuses and techniques to enable a computing device to detect a jamming signal and determine at least one frequency thereof to facilitate applying a countermeasure or taking another action.

In example implementations, a reference signal can be generated that has one or more known frequencies at corresponding time indices. In a receive chain, the reference signal can be mixed with a received signal to convert the received signal at a radio frequency (RF) to a lower frequency, such as an intermediate frequency (IF). As described herein, one or more frequencies of the reference signal may be selected based on the IF of the transceiver and one or more targeted frequencies of a potential jamming signal. This can establish a frequency relationship between the reference signal and the targeted frequencies of interest for a potential jamming signal.

The IF version of the received signal can be mixed with a local oscillator signal having the intermediate frequency to down convert the IF received signal to a baseband version of the received signal. The baseband received signal can then be processed to detect a jamming signal and determine a frequency thereof. To do so, the computing device can convert an analog version of the baseband received signal to a digital version of the baseband received signal by taking multiple samples thereof at respective time stamps, which need not correspond to a clock or absolute time. A processor can use the time stamps to temporally align the multiple samples of the baseband received signal with the reference signal that is indexed by time to thereby utilize a temporal relationship between the reference signal and a down-converted version of the received signal.

The processor can obtain correspondences between the received signal samples and the time-indexed reference signal through the alignment of the time stamps and the time indexing. A jamming signal may be detected for samples based on at least one threshold, such as for samples having a magnitude that exceeds the threshold. The processor can map the time stamp of the sample that is indicated to be part of a jamming signal to a time index of the reference signal. The frequency of the reference signal at this time index is linked to the time index and can be ascertained. Using the frequency relationship established between the reference signal and the targeted frequencies of potential jamming signals, the processor can determine the jamming frequency of the detected jamming signal. A countermeasure or another action can be taken based on the determined jamming frequency.

In some cases, at least a portion of the hardware that is used for radar transmitting and receiving, such as that used to detect proximate objects, can be "reused" for jammer detection. This can increase efficiencies and/or reduce circuitry size within a computing device. In these manners, jammers can be detected, and the frequencies of such jammers can be determined for targeted frequencies of potential jamming signals.

In an example aspect, an apparatus is disclosed. The apparatus includes a wireless transceiver configured to be connected to one or more antennas. The wireless transceiver is configured to translate a received signal from a first frequency to a second frequency using a reference signal to produce a translated received signal, with the reference signal including at least one frequency having an association with one or more targeted frequencies of a potential jamming signal. The wireless transceiver is also configured to convert at least a version of the translated received signal in an analog domain into a converted received signal in a digital domain. The wireless transceiver is additionally configured to detect that the converted received signal comprises a jamming signal based on the association and using at least one threshold. The wireless transceiver is further configured to determine a jamming frequency of the jamming signal based on the at least one frequency of the reference signal.

In an example aspect, an apparatus for jammer detection is disclosed. The apparatus includes means for translating a received signal from a first frequency to a second frequency using a reference signal to produce a translated received signal, with the reference signal including at least one frequency having an association with one or more targeted frequencies of a potential jamming signal. The apparatus also includes means for converting at least a version of the translated received signal in an analog domain into a converted received signal in a digital domain. The apparatus additionally includes means for detecting that the converted received signal comprises a jamming signal based on the association and using at least one threshold. The apparatus further includes means for determining a jamming frequency of the jamming signal based on the at least one frequency of the reference signal.

In an example aspect, a method for jammer detection is disclosed. The method includes translating a received signal from a first frequency to a second frequency using a reference signal to produce a translated received signal, with the reference signal including at least one frequency having an association with one or more targeted frequencies of a potential jamming signal. The method also includes converting at least a version of the translated received signal in an analog domain into a converted received signal in a digital domain. The method additionally includes detecting that the converted received signal comprises a jamming signal based on the association and using at least one threshold. The method further includes determining a jamming frequency of the jamming signal based on the at least one frequency of the reference signal.

In an example aspect, an apparatus is disclosed. The apparatus includes a wireless transceiver configured to be connected to one or more antennas. The wireless transceiver includes a mixer and a signal generator. The mixer is configured to be coupled between at least one antenna of the one or more antennas and a modem. The signal generator is coupled to the mixer. The signal generator includes a selection circuit, a frequency-varying local oscillator, and a local oscillator. The frequency-varying local oscillator is coupled to the selection circuit and is configured to generate a reference signal for proximity detection at a first time and for jammer detection at a second time. The local oscillator is coupled to the selection circuit and is configured to generate a local oscillator signal for wireless communication.

DETAILED DESCRIPTION

Figure 1:
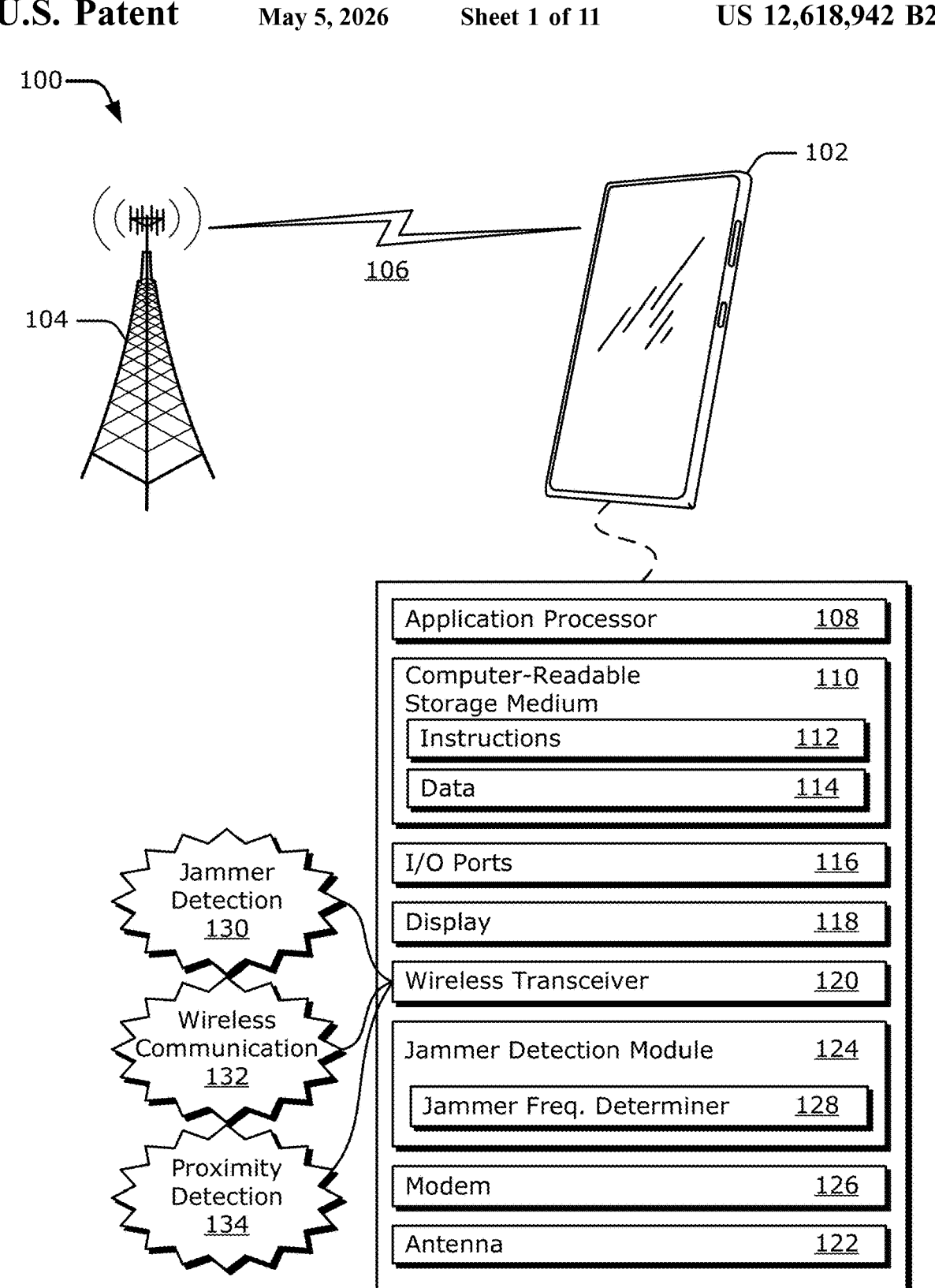
FIG. 1 illustrates an example operating environment for jammer detection as described herein.

To increase transmission rates and throughput, cellular and other wireless networks are using signals with higher frequencies and smaller wavelengths. As an example, 5th or 6th generation (5G or 6G)-capable devices communicate with networks using frequencies that include those at or near the extremely-high frequency (EHF) spectrum (e.g., frequencies greater than 25 gigahertz (GHz)) with wavelengths at or near millimeter wavelengths. These signals are associated with various technological challenges, such as higher path loss as compared to signals for earlier generations of wireless communications at relatively lower frequencies. For example, in certain scenarios it can be difficult for a 5G or 6G wireless signal to travel far enough to make cellular communications feasible at these higher frequencies. One portion of the EM spectrum that has higher frequencies and may be used frequently is a part of the 5G licensed band, such as the 24.25 GHZ to 28.25 GHz frequency range.

To compensate for the higher path loss of higher frequencies, transmit power levels can be increased, or beamforming can concentrate energy in a particular direction. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to achieve given cost, size, functional design objectives, and/or other relevant constraints.

Thus, current high-frequency and small-wavelength communications balance performance with an obligation to meet the FCC's maximum permitted exposure limit (e.g., the FCC's MPE limit). Inefficient balancing can prevent devices from taking full advantage of increased data rates (e.g., those enabled by 5G wireless communications). Because exposure is affected by the proximity of a user to a device's antenna, however, certain techniques described in this document enable greater wireless performance while staying within the FCC's MPE limit. To do so, these techniques relate to detecting a user's proximity to a device.

Based on the detected proximity, the device can balance a power density of transmitted wireless signals with a requirement to meet a particular MPE limit. As a result, the device may be permitted to transmit wireless signals with higher average power levels. These higher average power levels can enable the wireless signals to travel farther, such as between a smartphone and a remote cellular base station. Certain devices and techniques described herein may additionally or alternatively be used to comply with radio frequency exposure requirements promulgated by a nongovernmental organization or a jurisdiction outside of the United States.

Some proximity-detection techniques may use a dedicated sensor to detect the user, such as a camera or an infrared sensor. But these sensors may be bulky or expensive. Furthermore, a single electronic device can include multiple antennas that are positioned on different surfaces of a housing of the device (e.g., on a top, a bottom, or opposite sides). To account for each of these antennas, multiple cameras or sensors may need to be installed near each of these antennas, which further increases the cost and size of the electronic device.

Instead, certain devices and techniques for proximity detection that are described herein can utilize a wireless transceiver and one or more antennas within a computing device to transmit and receive radar signals and determine a range (e.g., a distance or slant range) to an object. In conjunction with proximity detection, a transmission parameter that is used for wireless communication can be adjusted to enable the wireless transceiver to meet guidelines promulgated by the government or the wireless industry, such as a Maximum Permitted Exposure (MPE) limit as determined by the FCC. Further, by actively measuring the range to an object, a surrounding environment can be continually monitored, and the transmission parameter can be incrementally adjusted to account for movement by the object while achieving a desired false-alarm rate. Additionally, certain devices and techniques described herein may additionally or alternatively be used for, or modified for, purposes other than exposure compliance. Examples of other purposes are to detect objects other than a user, to map an environment, to provide other forms of radio frequency (RF) or mmW sensing, to implement sensor-assisted communication, to implement joint-device communicating and sensing, to detect jamming signals, and so forth.

In example operations for using radar for proximity detection, a device can transmit a radar transmit signal and receive a corresponding radar receive signal. The radar receive signal may include a reflection signal component that is created by an object that is impacted by the radar transmit signal. To perform proximity detection, the device can identify the reflected signal component and take appropriate remedial action, such as by changing transmission power or radiation direction.

Accordingly, a computing device can employ proximity detection to detect nearby objects with a radar receive signal using hardware such as antennas, transmitters, receivers, mixers, frequency generators, and so forth. If a radar transmit signal reflects from a proximate object, the radar receive signal can include a reflection signal component. Responsive to detection of the reflection signal component, the computing device can adjust one or more transmission parameters for wireless communication based on a distance to an object, for instance, to account for an MPE limit. In some implementations that are described herein, at least part of transceiver hardware that is usable to comport with an MPE limit (e.g., with radar signal reception) may be repurposed or extended for use to detect a jamming signal and to determine a frequency thereof. Thus, some hardware may be shared between at least two functionalities to increase efficiency or reduce circuitry within a computing device. In other implementations, however, jammer detection hardware may be dedicated to jammer detection functionality or at least separate from hardware supporting proximity detection, if such hardware is present.

Apparatuses and methods are disclosed that implement jammer detection. A computing device with a transceiver can receive a jamming signal. In some cases, a jamming signal may be a wireless signal having a frequency and magnitude that causes interference with, or otherwise negatively impacts use of, a desired signal. If a jamming signal is detected, the computing device can act to avoid the jamming signal or at least reduce the negative effects thereof. For example, a quantity of potential countermeasures can be increased if a frequency of the jamming signal can be determined. Further, if the frequency of the jamming signal is known, the device may be able to reduce efforts to counteract the jamming signal. For instance, if a jamming signal is on a frequency that is less impactful to the processing of another signal, an amount of filtering that is applied to the other signal may be reduced to save power.

This document describes apparatuses and techniques to enable a computing device to detect a jamming signal and determine at least one frequency thereof. To do so, a reference signal is generated that has a known frequency at each corresponding time index of multiple time indices. A frequency-modulated continuous-wave (FMCW) signal may be used, for instance. The reference signal can be mixed with a received signal to convert a radio frequency (RF) of the received signal to a lower frequency, such as an intermediate frequency (IF). One or more frequencies of the reference signal may be selected based on the IF of the transceiver and the targeted frequency or frequencies of a potential jamming signal. This is but one example approach for establishing a frequency relationship between the reference signal and one or more targeted frequencies of interest for a potential jamming signal. In some cases, a difference between the targeted frequency of the potential jamming signal and a reference frequency of the reference signal may comport (e.g., may substantially match) with the IF.

The IF version of the received signal can be mixed with a local oscillator signal having the intermediate frequency to downconvert the IF received signal to a baseband version of the received signal. The baseband received signal can then be processed to detect a jamming signal and determine a frequency thereof. To do so, the device can convert an analog version of the baseband received signal to a digital version of the baseband received signal by taking multiple samples thereof. The processor can temporally align these multiple samples having multiple time stamps with the reference signal that is indexed by time to utilize a temporal relationship between the reference signal and the received signal. The processor can determine correspondences between the received signal samples and the time-indexed reference signal with this temporal relationship.

The processor can determine samples of interest (e.g., those that may be associated with a jamming signal) by comparing magnitudes of the samples to at least one threshold. The threshold may be, for instance, based on a full scale or range of an analog-to-digital converter (ADC) that produces the samples. Samples that exceed the threshold can be identified as relevant samples and/or designated as being part of a jamming signal. The identified relevant samples can be associated with discrete times, such as the multiple time stamps. The processor can map the time stamps of the identified samples of the received signal to corresponding time indices of the reference signal responsive to the time at which the reference signal is applied to the received signal for frequency translation from a first frequency to a second frequency (e.g., from an RF to an IF for frequency down conversion).

The mapped time indices can be linked to the frequency or frequencies of the reference signal. These linked frequencies can indicate a frequency of the jamming signal. To determine the frequency of the jamming signal, the frequency of the reference signal at the linked time indices can be modified by the frequency amount (e.g., a frequency difference) established between the potential jamming signal and the reference signal as part of the above-described frequency relationship. For instance, the jamming signal frequency can be determined by adding a frequency of the IF local oscillator signal to the ascertained reference frequency of the reference signal at the linked time index that is based on the above-described temporal relationship.

In these manners, a jamming signal can be detected, and a frequency of the jamming signal can be determined. If a jamming frequency (e.g., a harmonic of a first frequency, which may be in FR1) of a jamming signal of a first communication is causing interference (e.g., on an IF line) with respect to frequencies (e.g., a second frequency, which may be in FR2) that are being used in a second communication, the system (e.g., the detecting device or another device in communication with the detecting device) may be able to switch the first communication to another frequency (and/or switch the second communication to another frequency). In some cases, the interfering frequency may be a harmonic of one signal of one communication that "lands" in the intermediate frequency range of another communication. On the other hand, if no jamming signal is determined to affect a certain frequency range, then a level of filtering may be lowered (e.g., a quantity of poles for a filter being used can be reduced, such as a baseband filter that "precedes" an ADC) to save power while signals in this frequency range are being filtered. Further, a sampling rate (Fs) of the ADC can be lowered, in some cases as low as the Nyquist rate, to save power if a jamming frequency of a jamming signal differs from a frequency of a desired signal. These and other implementations are described herein.

Generally, some implementations may offer a relatively inexpensive approach that can utilize existing transceiver hardware and antennas. A jammer detection module may marginally impact a design of a wireless transceiver and can be implemented in software or hardware, which may be at least partially shared with components for user and/or proximity detection, or vice versa. Nonetheless, jammer detection as described herein can be implemented outside of hardware that supports user and/or proximity detection capabilities.

FIG. 1 illustrates an example environment 100 for jammer detection. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, customer premises equipment (CPE), a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, a proximity detection apparatus for a drone or passenger vehicle, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, another smartphone, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular: IEEE 802.11 (e.g., Wi-Fi®): IEEE 802.15 (e.g., Bluetooth® or UWB): IEEE 802.16 (e.g., WiMAX®); and so forth. In some implementations, the wireless link 106 may wirelessly provide power, and the base station 104 or the computing device 102 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), nonvolatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, Ethernet ports, audio ports, infrared (IR) ports, user interface ports such as a sensing portion of a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented, and/or the display 118 can be omitted.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, ultra-wideband (UWB) network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via an antenna 122. Components of the wireless transceiver 120 can include amplifiers, switches, mixers, analog-to-digital converters, digital-to-analog converters, filters, and so forth for conditioning signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122 for wireless communication 132 and/or processes signals associated with proximity detection 134 and/or jammer detection 130.

In the example shown in FIG. 1, the computing device 102 includes at least one jammer detection module 124 and at least one modem 126. The jammer detection module 124 can be a separate module or integrated within the wireless transceiver 120 and/or the modem 126. In general, the jammer detection module 124 can be incorporated in or realized using software, firmware, hardware, fixed logic circuitry, or combinations thereof. The jammer detection module 124 can be implemented within an integrated circuit or as part of the modem 126 or other electronic component of the computing device 102. In some implementations, the modem 126 may execute computer-executable instructions that are stored within the illustrated CRM 110 or another CRM to implement the jammer detection module 124.

In example implementations, the jammer detection module 124 can perform jammer detection 130, such as by detecting a presence of a jamming signal. To do this, the jammer detection module 124 can ascertain if a signal on an undesired frequency has been received. For example, the jammer detection module 124 can detect if a received signal has a sufficiently high magnitude on an undesired frequency using a frequency relationship that is described herein. This enables the device to be aware that a jamming signal may be impacting operational performance. Accordingly, the device can implement a countermeasure to improve operational performance. This detection alone may not, however, reveal the frequency of the detected jamming signal. It can be problematic to employ an optimum countermeasure if the jamming frequency of the jamming signal is unknown.

In other example implementations, the jammer detection module 124 includes at least one jammer frequency determiner 128. The jammer frequency determiner 128 can determine a frequency of a detected jamming signal. The jamming frequency can be determined by analyzing a portion of a received signal that has been detected to include a jamming signal. The received signal portion may be identified by time, such as a time stamp of a digitized sample of the received signal. The jammer frequency determiner 128 can determine the frequency of the jamming signal using the frequency relationship noted above and based on a temporal relationship. The temporal relationship can enable a sample of the received signal to be mapped to a time-indexed portion of a reference signal that is used for frequency translation (e.g., frequency down conversion). The jammer frequency determiner 128 may then determine the jamming frequency from the reference signal using the frequency relationship, which can associate frequencies of the reference signal to one or more targeted frequencies of potential jamming signals.

The modem 126, which can be implemented as at least one processor, controls the wireless transceiver 120 and enables jammer detection 130, wireless communication 132, and/or proximity detection 134 to be performed. The modem 126 can include a portion of the CRM 110 or can access the CRM 110 to obtain computer-readable instructions. The modem 126 can include baseband circuitry to perform high rate sampling processes that can include analog-to-digital conversion, digital-to-analog conversion, Fourier transforms, gain correction, skew correction, frequency translation, and so forth. The modem 126 can provide communication data to the wireless transceiver 120 for transmission. The modem 126 can also process a baseband version of a received signal obtained from the wireless transceiver 120 to generate data. The data can be provided to other parts of the computing device 102 via a communication interface for wireless communication 132, or the data can be used for a detection operation in accordance with jammer detection 130 or proximity detection 134.

The computing device 102 can also include a controller (not separately shown), e.g., to realize the jammer detection module 124. The controller can include at least one processor and CRM, which stores computer-executable instructions (such as the application processor 108 or a general-purpose or dedicated microprocessor, the CRM 110, and the instructions 112). The processor and the CRM can be localized at one physical module or one integrated circuit chip or can be distributed across multiple physical modules or chips. Together, a processor and associated instructions can be realized in separate circuitry, fixed logic circuitry, hard-coded logic, and so forth. The controller can be implemented as part of the wireless transceiver 120, the modem 126, the application processor 108, a special-purpose processor configured to perform MPE techniques or jammer detection techniques, a general-purpose processor, some combination thereof, and so forth.

In example implementations, the wireless transceiver 120 supports jammer detection 130, proximity detection 134, and/or wireless communication 132. For instance, the wireless transceiver 120 can be configured to perform proximity detection 134 during a first time interval and to perform wireless communication 132 during a second time interval. During instances of the first time interval in which radar-based proximity detection 134 is not being performed, the wireless transceiver 120 can implement jammer detection 130. In some cases, at least a portion of the hardware used to perform proximity detection 134 can be "reused" or shared to perform jammer detection 130.

In other example implementations, the wireless transceiver 120 supports jammer detection 130 and/or proximity detection 134 but does not support wireless communication 132. In these cases, the wireless transceiver 120 can be a transceiver of a dedicated radar system, which may be integrated within the computing device 102 or realized as a stand-alone radar system. In still other example implementations, the wireless transceiver 120 supports other applications, which can benefit from aspects of jammer detection 130 or proximity detection 134 as described herein. In additional examples, separate transceivers (or at least separate receive chains) are respectively configured for jammer detection 130, for proximity detection 134, and for wireless communication 132.

Figure 2:
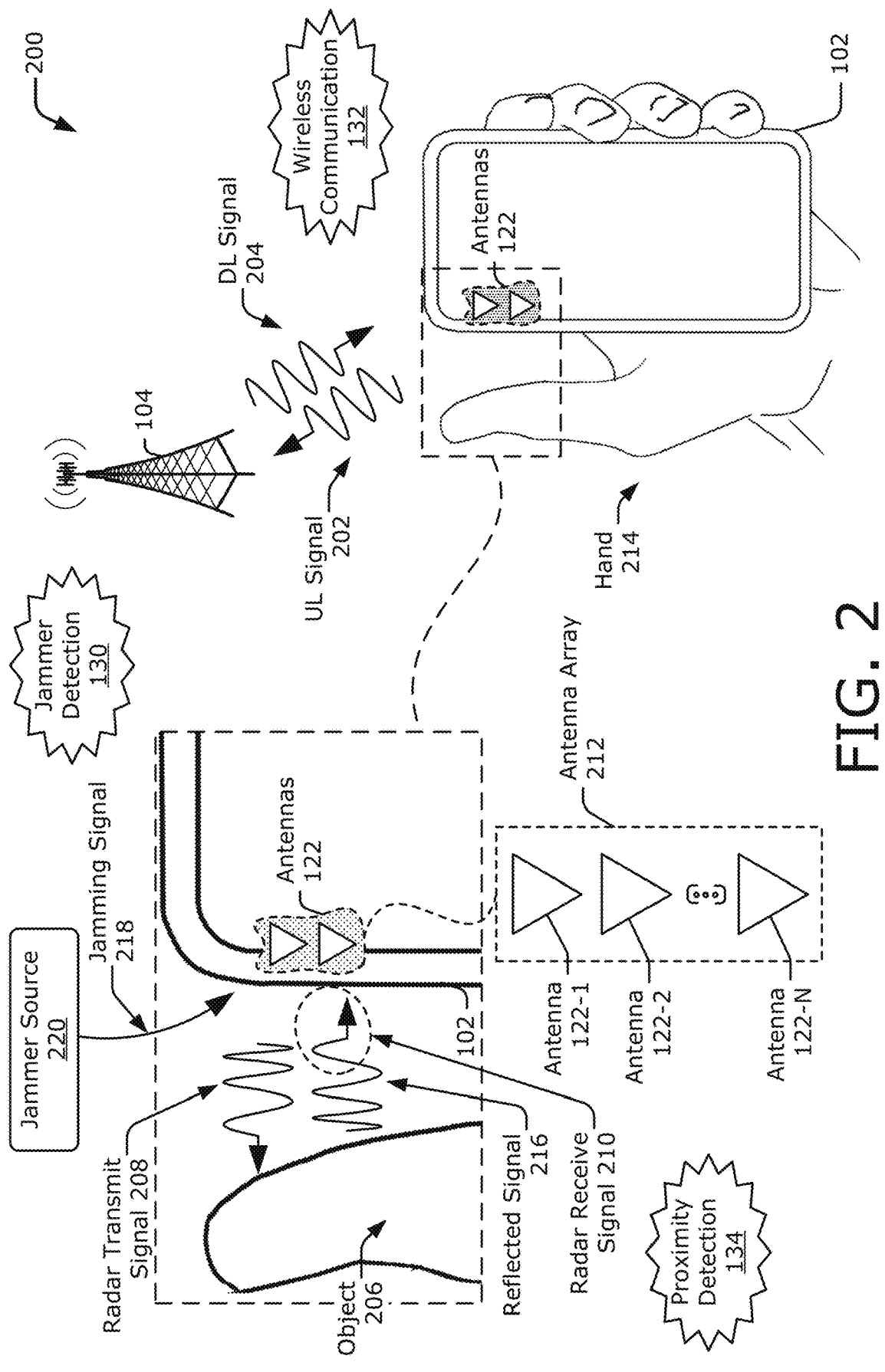
FIG. 2 illustrates an example operating environment for performing jammer detection, wireless communication, or proximity detection alone or in any combination.

FIG. 2 illustrates an example operating environment 200 for performing jammer detection 130, wireless communication 132, or proximity detection 134, either alone or in any combination. In the example environment 200, a hand 214 of a user holds the computing device 102. In one aspect, for wireless communication 132, the computing device 102 communicates with the base station 104 by transmitting an uplink signal 202 (UL signal 202) or receiving a downlink signal 204 (DL signal 204) via the two or more antennas 122. A user's thumb, however, can represent a proximate object 206 that may be exposed to radiation via the uplink signal 202.

Other situations are also possible in which the user represents the proximate object 206, including those in which the user is near the computing device 102 but not physically touching the computing device 102. In an example situation, the computing device 102 is positioned within arm's reach of the user on a desk. As another example situation, the computing device 102 is propped up on a table and the user is watching a video on the computing device 102 from a distance or the computing device 102 is being used as a hotspot. In still another example situation, the computing device 102 is realized as a customer premises equipment (CPE), such as an access point or fixed cellular device, where a user may occasionally approach the device.

To detect whether the object 206 exists or is within a detectable range, the computing device 102 transmits a radar transmit signal 208 via at least one of the antennas 122 and receives a radar receive signal 210 via at least another one of the antennas 122. In some cases, the radar receive signal 210 can be received during a portion of time that the radar transmit signal 208 is transmitted or is being transmitted. The radar transmit signal 208 can be implemented, for example, as a frequency-modulated continuous-wave (FMCW) signal or a frequency-modulated pulsed signal. The type of frequency modulation can include a linear frequency modulation, a triangular frequency modulation, a sawtooth frequency modulation, and so forth. Based on the radar receive signal 210, the presence of and/or the range to the object 206 can be determined. The same antennas 122 or a subset of the same antennas 122 used to communicate with the base station 104 can be used for radar operation, for example to determine a range to the object 206. In other examples, one or more of the antennas 122 used for radar operation are not used for communicating with the base station 104.

In FIG. 2, the radar receive signal 210 is shown to include a reflected signal 216. The reflected signal 216 includes a version or portion of the radar transmit signal 208 that is reflected by the object 206. A propagation distance between the antennas 122 and the object 206, a partial absorption of the radar transmit signal 208 via the object 206, and/or an initial transmit power of the radar transmit signal 208 may change a strength of the reflected signal 216. The reflected signal 216 may also have a different phase or frequency relative to the radar transmit signal 208 based on reflection properties or motion of the object 206. In general, the reflected signal 216, or reflected signal component, contains information that can be used for detecting the object 206 and for determining a range to the object 206.

FIG. 2 also includes a jamming signal 218. The jamming signal 218 originates from a jammer source 220, such as a transmitter or another computing device. Thus, the jamming signal 218 can be separate from and/or independent of the radar transmit signal 208. The jamming signal 218 may be partially or completely reflected by the object 206 or another object or may "directly" propagate between the jammer source 220) and the one or more antennas 122.

The one or more antennas 122 may be arranged via arrays or modules and may have a variety of configurations. For example, the one or more antennas 122 may comprise at least two different antennas, at least two antenna elements of an antenna array 212 (as shown towards the lower center portion of FIG. 2), at least two antenna elements associated with different antenna arrays, or any combination thereof. The antenna array 212 is shown to include multiple antennas 122-1 to 122-N, where N represents a positive integer greater than one. Thus, the wireless transceiver 120 (e.g., of FIGS. 1, 5, and 7) can be connected to multiple antennas 122-1 to 122-N.

Further, the antenna array 212 may be a multi-dimensional array. Additionally or alternatively, the array 212 may be configured for beam management techniques, such as beam determination, beam measurement, beam reporting, or beam sweeping. A distance between the antennas 122 within the antenna array 212 can be based on frequencies that the wireless transceiver 120 emits or is to receive. For example, the antennas 122 can be spaced apart by approximately half a wavelength from one another (e.g., by approximately half a centimeter (cm) apart for frequencies around 30 GHz). The antennas 122 may be implemented using any type of antenna, including patch antennas, dipole antennas, bowtie antennas, or a combination thereof.

Consider, for example, the one or more antennas 122 as comprising the first antenna 122-1 and the second antenna 122-2 of the antenna array 212. In operation, for proximity detection 134, the first antenna 122-1 transmits the radar transmit signal 208, and the second antenna 122-2 receives the radar receive signal 210. In operation, for jammer detection 130, any one or more of the antennas 122-1 to 122-N may receive the jamming signal 218 for analysis relating to detection of the jamming signal 218 or determination of the jamming frequency. Thus, an antenna 122 is one example of hardware that may be shared between jammer detection 130 and proximity detection 134. With proximity detection 134, a transmission parameter can be adjusted for use during wireless communication 132 responsive to detection of an object 206. An example sequence for switching between proximity detection 134 and wireless communication 132 is described next with respect to FIG. 3.

Figure 3:
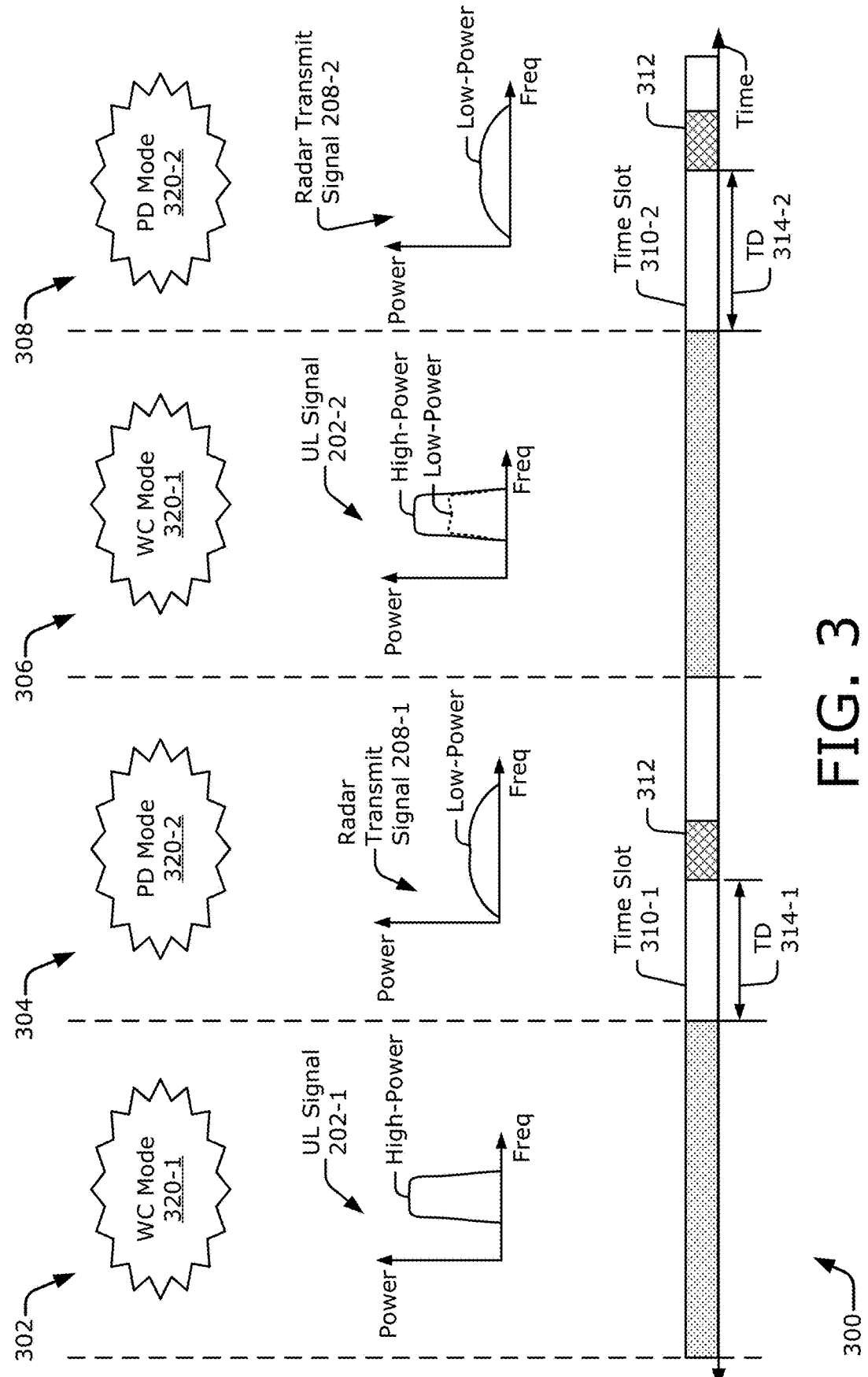
FIG. 3 illustrates an example sequence flow diagram for performing proximity detection with regard to wireless communication for an operating environment that can incorporate jammer detection as described herein.

FIG. 3 illustrates an example sequence flow diagram 300 for performing proximity detection 134 with regard to wireless communication 132 for an operating environment that can incorporate jammer detection 130 (each of FIGS. 1 and 2) as described herein. In FIG. 3, time elapses from left to right. Examples of a wireless communication mode 320-1 (WC mode 320-1) are shown at 302 and 306. Examples of a proximity detection mode 320-2 (PD mode 320-2) are shown at 304 and 308.

The proximity detection mode 320-2 can occur during a time slot 310, such as time slot 310-1 at 304 or a time slot 310-2 at 308. A time slot 310 can include a time interval in which proximity detection 134 is performed by the computing device 102. As described below; the computing device 102 may instead perform jammer detection 130) during a time slot 310. An example time slot 310 includes an uplink random-access-channel (RACH) time slot (UL RACH time slot). The time slot 310 can occur at fixed time intervals or at other times, between active data cycles that occur during wireless communication 132, at predetermined times as set by the modem 126, as part of an initialization process before wireless communications 132 occur, and so forth. Additionally or alternatively, some implementations of the computing device 102 can perform jammer detection 130 or proximity detection 134 responsive to detection of device movement, or based on indications that the user may be proximate to the computing device 102 (e.g., based on the wireless transceiver 120 observing a decrease in power in a downlink signal 204, based on the application processor 108 determining that the user is interacting with the display 118 of the computing device 102, or based on a signal being received becoming unintelligible).

At 302, the wireless transceiver 120 transmits a high-power (e.g., normal) uplink signal 202-1 configured to provide sufficient range to a destination, such as a base station 104. After transmitting the uplink signal 202-1, the computing device 102 transmits a radar transmit signal 208-1 during a first time slot 310-1 at 304. An example duration of a transmission of the radar transmit signal 208-1 within the first time slot 310-1 is represented by a diamond pattern at 312. A start time of the radar transmit signal 208-1 can be based on a time delay 314-1 (TD 314-1), which may be relative to a start time of the first time slot 310-1.

As described above, a radar transmit signal 208 enables the computing device 102 to detect an object 206 and determine if the object 206 is "near" the computing device 102. At 304, the radar transmit signal 208-1 is represented by a low-power wide-band signal. In example implementations, the radar transmit signal 208-1 can have a bandwidth of approximately 2 GHZ or more (e.g., 2 GHZ, 3 GHZ, 4 GHZ, and so forth). Based on an object or proximity detection, the wireless transceiver 120 can adjust a transmission parameter for a next uplink signal 202 to account for MPE compliance guidelines. Instead of proximity detection 134 at 304, the computing device 102 can operate analogously for jammer detection 130 at 304 as described herein. In other examples, jammer detection 130 is performed during the same time slot 310 as proximity detection is preformed, for example during portions of the time slot 310 outside of the portion represented by the pattern 312.

In some examples, the proximity detection mode 320-2 can determine the range to the object 206, thereby enabling transmission of a next uplink signal 202 to comply with safety guidelines, such as a maximum power density. Because power density is proportional to transmit power and inversely proportional to range, an object at a closer range is exposed to a higher power density than another object at a farther range for a same transmit power level. Therefore, a similar power density at the object 206 can be achieved by increasing the transmit power level if the object 206 is at a relatively farther range and decreasing the transmit power level if the object 206 is at a relatively closer range. In this way, the wireless transceiver 120 can adjust transmission of the uplink signal 202 to enable the power density at the object 206 for both the closer range and the farther range to be below the maximum power density. At the same time, because the range is known, the transmit power level can be increased to a level that facilitates wireless communication 132 and comports with a compliance guideline.

At 306, the wireless transceiver 120 transmits a next uplink signal 202-2. In the depicted example, the uplink signal 202-2 can be a high-power uplink signal if an object 206 is not detected at 304. Alternatively, the uplink signal 202-2 can be a low-power uplink signal if an object 206 is detected at 304. The low transmit power can be, for example, between approximately five and twenty decibel-milliwatts (dBm) less than the high-power signal at 302.

In addition to or instead of changing a power, the uplink signal 202-2 at 306 can be transmitted using a different antenna within the computing device 102 or using a different beam steering angle (e.g., different than the antennas 122 or different from the beam steering angle used for transmitting the uplink signal 202-1 at 302). In some implementations, the computing device 102 can use a different beamforming configuration to improve signal-to-noise ratio based on the angle to the object 206 or an angle of incidence of a jamming signal 218. Although not shown, the wireless transceiver 120 can alternatively "skip" or "delay" the wireless communication mode 320-1 at 306 and perform another round of proximity detection 134 using another antenna or a different transmit power level to detect one or more objects (e.g., the object 206) at various locations, distances, or angles around the computing device 102. The wireless transceiver 120 can also "substitute" in a round of jammer detection 130 at 306 or "insert" a round of jammer detection 130 between 304 and 306. Although certain operations are described above based on a range to the object 206, it will be appreciated that operations in the wireless communication mode 320-1 at 306 or adjustments made pursuant to the proximity detection mode 320-2 at 304 may be based merely upon whether the object 206 is present or not (e.g., detected or not), irrespective of the range thereto (e.g., regardless of whether the range can be or has been determined).

At 308, the wireless transceiver 120 and the antenna 122 transmit another radar transmit signal 208-2 during a second time slot 310-2 to attempt to detect the object 206 (or another object). A second time delay 314-2 (TD 314-2) associated with the radar transmit signal 208-2 can be similar to or different from the first time delay 314-1. Responsive to transmission of each radar transmit signal 208, the computing device 102 may attempt to receive and process a radar receive signal 210 (e.g., of FIGS. 2 and 5) as part of the proximity detection mode 320-2.

Figure 5:
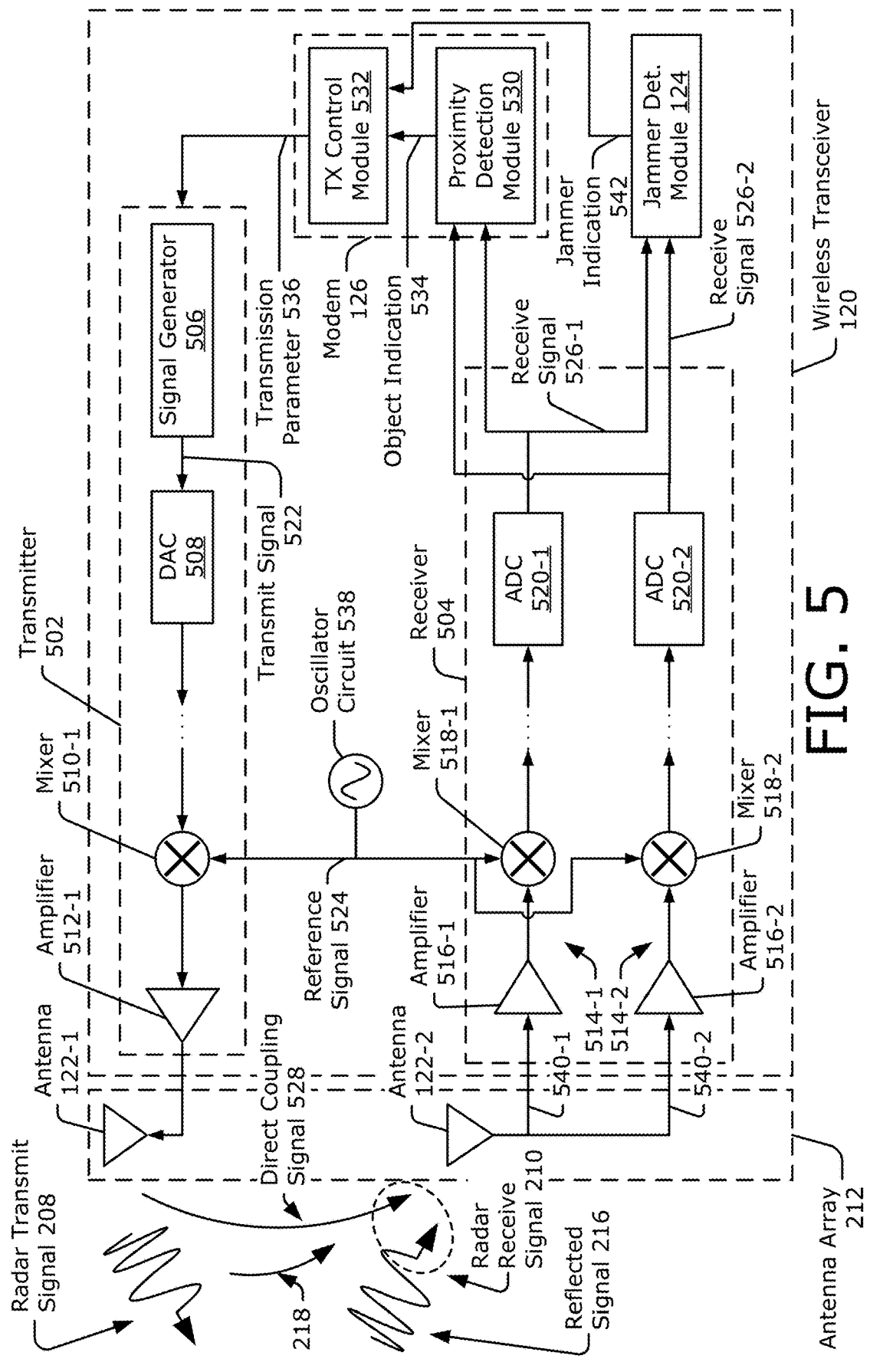
FIG. 5 illustrates examples of a wireless transceiver, a jammer detection module, a proximity detection module, and a modem that can perform jammer detection and proximity detection.
Figure 7:
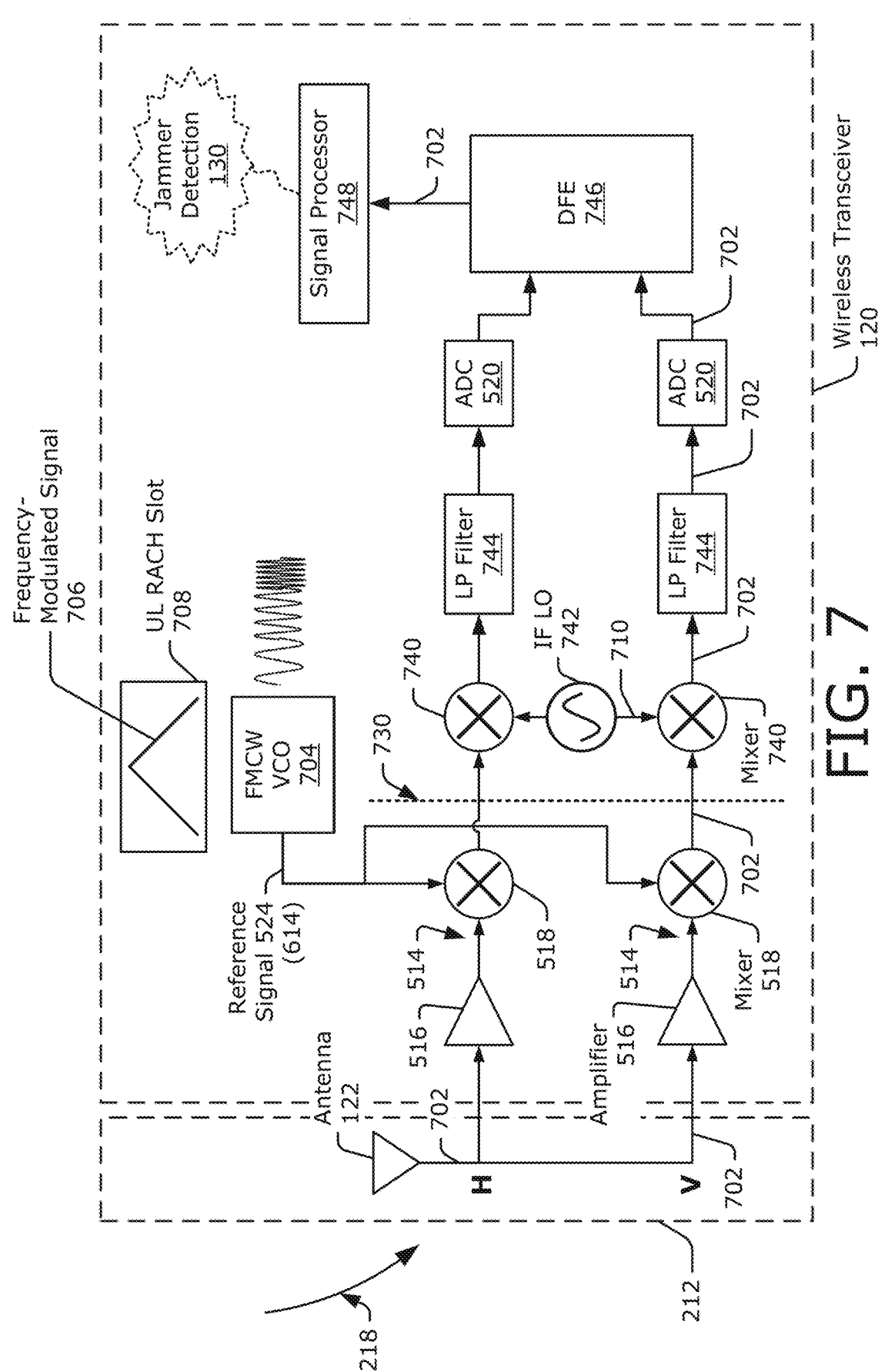
FIG. 7 illustrates additional examples of a wireless transceiver in which a jamming signal can be detected and a jamming frequency thereof can be determined.

At 308, instead of (or in addition to) performing proximity detection 134, the wireless transceiver 120 and the antenna 122 can receive a signal and attempt to detect if the received signal includes a jamming signal 218 (e.g., of FIGS. 2, 5, and 7). If so, the wireless transceiver 120 can also determine a jamming frequency as described herein. The wireless communication mode 320-1 and the proximity detection mode 320-2 are illustrated separately in FIG. 3 and do not overlap in some examples. In other examples, however, certain wireless communications may be transmitted during the proximity detection mode 320-2 (and/or a jammer detection mode) or a portion thereof.

By scheduling multiple radar transmit signals 208 over some time period, transmission of the uplink signal 202 can be dynamically adjusted based on a changing environment or movement by the object 206 or other objects or jamming signals that vary over time, direction, or intensity. Furthermore, appropriate adjustments can be made to balance wireless communication performance with beam management and compliance with radiation requirements. The sequence described above can also be applied to other antennas. The other antennas and the antennas 122 may transmit multiple radar transmit signals 208 sequentially or in parallel or may receive multiple receive signals for jamming signal detection functionality.

The example sequence flow diagram 300 illustrates alternating modes between a wireless communication mode 320-1 and a proximity detection mode 320-2. In some implementations, one or more phases 302, 304, 306, or 308 (up to all such phases) that are described above as pertaining to the proximity detection mode 320-2 can be replaced with a jammer detection mode. In a jammer detection mode, the signal transmission aspect can be omitted as described below. Alternatively, each of those phases may be divided into proximity detection mode and jammer detection mode portions. In still other implementations, jammer detection 130 as described herein may be performed at other times, at different intervals, on a non-interval basis, at random times, in response to a condition (e.g., poor signal reception or device movement), and so forth. In any of these cases, at least some hardware may be shared between jammer detection functionality and proximity detection functionality, although such sharing need not be part of all implementations. Example aspects of jammer detection functionality are described next with reference to FIG. 4.

Figure 4:
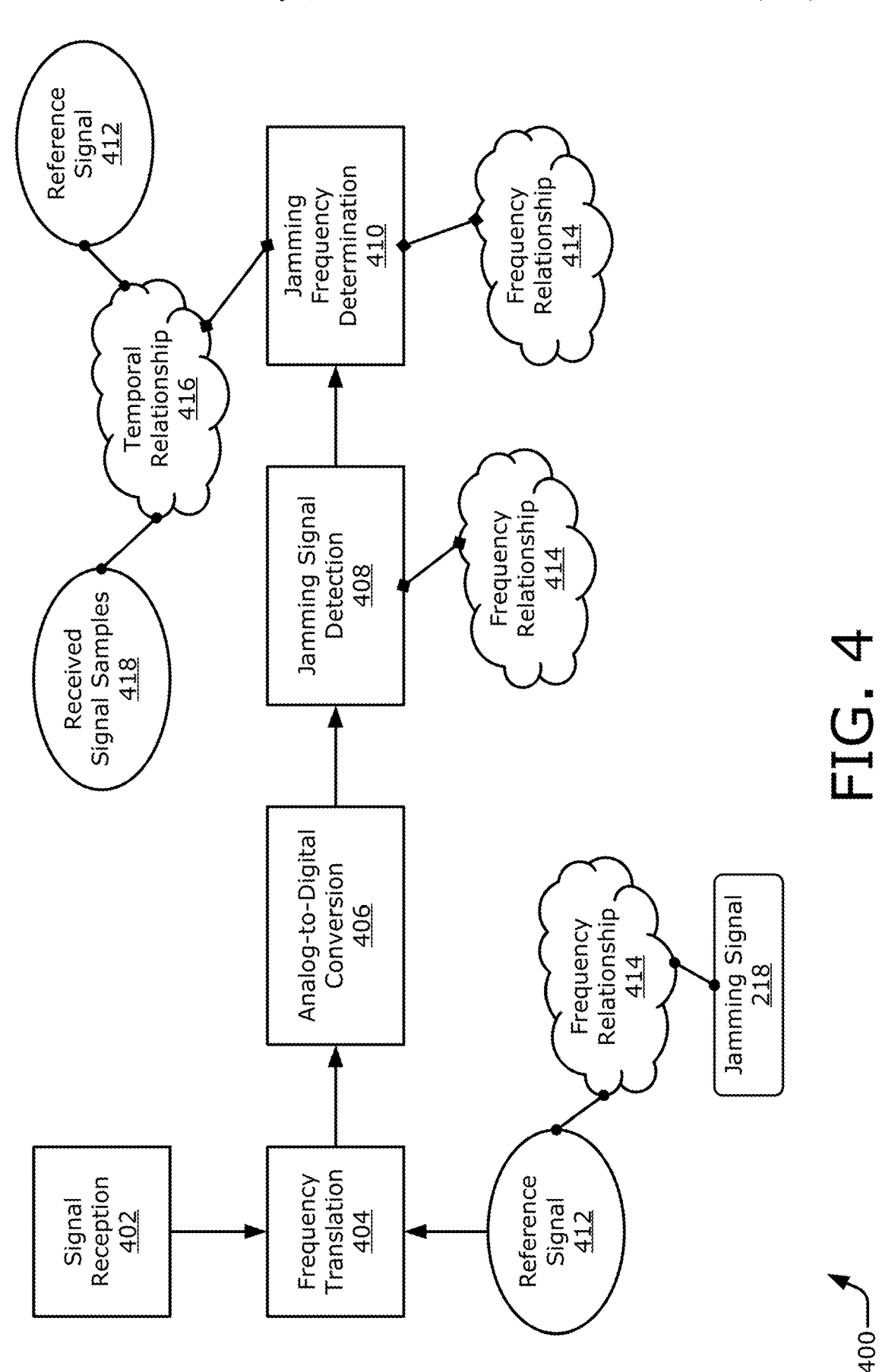
FIG. 4 illustrates an example scheme for performing jammer detection and jammer frequency determination as described herein.

FIG. 4 illustrates an example scheme 400 for performing jammer detection and jammer frequency determination as described herein. At 402, a signal can be received via one or more antennas. Once a received signal is obtained, the wireless transceiver 120 can perform a frequency translation 404 on the received signal using a reference signal 412 to down convert the frequency thereof. The reference signal 412 may be generated so as to have a known frequency relationship 414 with one or more frequencies of interest for (or targeted frequencies of) potential jamming signals.

In some cases, the frequency relationship 414 involves at least one frequency of the reference signal 412, one or more targeted frequencies of potential jamming signals 218, and an intermediate frequency (IF) of an IF portion of the wireless transceiver 120. Examples of a frequency relationship 414 are described below with reference to FIG. 8. The reference signal 412 can also have an ascertainable correspondence between frequency or frequencies of the signal and time indices thereof. Examples of a linkage between time index and frequency are described below with reference to FIG. 9.

The wireless transceiver 120 or the modem 126 can perform an analog-to-digital conversion 406 on a down-converted version of the received signal to produce multiple samples, or received signal samples 418, which have multiple time stamps. The jammer detection module 124 analyzes the multiple samples to perform a jamming signal detection 408. For example, the jammer detection module 124 can compare a magnitude of each sample to at least one threshold. If a sample meets at least one threshold (e.g., exceeds a threshold), then the jammer detection module 124 can designate the sample as being part of a jamming signal 218. The detection of a jamming signal 218 may further be based on the frequency relationship 414 between the jamming signal 218 and the reference signal 412 that is established by one or more frequencies selected for the reference signal 412.

For at least one sample (of the multiple received signal samples 418) that is part of a jamming signal 218, the jammer frequency determiner 128 can determine a jamming frequency corresponding thereto by performing a jamming frequency determination 410. To do so, the jammer frequency determiner 128 can map a time stamp of the sample designated as being part of the jamming signal 218 to a time index of the reference signal 412 to apply a temporal relationship 416 that exists between the reference signal 412 and the sampled jamming signal as obtained by the signal reception 402. Examples of a temporal relationship 416 are described below with reference to FIG. 9.

The jammer frequency determiner 128 can also link the mapped time index to a frequency of the reference signal 412. Based on the linked frequency of the reference signal 412, the jammer frequency determiner 128 may determine a jamming frequency in accordance with the frequency relationship 414 to determine a frequency of the jamming signal 218. The signals that are described herein need not be signals that are conveyed between different circuits or components (although they may be): rather, the signals may be a representation of signal data that is being processed and/or a determination or identification (e.g., in at least one processor) of whether a jammer has been detected and that a jamming frequency thereof has been determined, and/or signals may include the setting of a register or a storing of a value.

FIG. 5 illustrates examples of a wireless transceiver 120, a jammer detection module 124, a proximity detection module 530, and a modem 126 that can perform jammer detection and proximity detection. The wireless transceiver 120 can be implemented as a direct-conversion transceiver or a superheterodyne transceiver. In the depicted configuration, the wireless transceiver 120 includes a transmitter 502 and a receiver 504. The transmitter 502 is coupled between the modem 126 and the antenna array 212. The transmitter 502 is shown to include at least one signal generator 506, at least one digital-to-analog converter (DAC) 508, at least one mixer 510-1, and at least one amplifier 512-1 (e.g., a power amplifier).

The signal generator 506 can generate a digital signal (e.g., a transmit signal 522), which may be used to derive the radar transmit signal 208 or the uplink signal 202 (of FIGS. 2 and 3). Although shown separately, the signal generator 506 or a portion thereof may be implemented in the modem 126. The transmitter 502 can be connected to at least one feed port (not explicitly shown) of the antenna 122-1, such as at least one differential feed port of a dipole antenna, at least one polarized feed port of a patch antenna, or at least one directional feed port of a bowtie antenna. In some examples, the radar transmit signal 208 is generated directly in an RF circuit without use of the digital signal 522 or the signal generator 506.

The receiver 504 is coupled between the antenna array 212 and the jammer detection module 124 or the proximity detection module 530. In general, the receiver 504 may include at least two channels 514 (or layers), which are coupled to different feed ports of one or more antennas 122. In the depicted configuration, channels 514-1 and 514-2 represent two parallel channels within the receiver 504 that are respectively connected to two feed ports of the antenna 122-2. In some cases, the two feed ports may be polarized differently (e.g., with one a vertical (V) polarization and one a horizontal (H) polarization). Although a single antenna 122-2 is shown to be connected to the two channels 514-1 and 514-2, the channels 514-1 and 514-2 can alternatively be respectively connected to two different antennas 122, such as the second antenna 122-2 and the Nth antenna 122-N of FIG. 2. The channels 514-1 and 514-2 respectively include at least one amplifier 516-1 and 516-2 (e.g., a low-noise amplifier), at least one mixer 518-1 and 518-2, and at least one analog-to-digital converter (ADC) 520-1 and 520-2. Although depicted separately, the DAC 508 and/or the ADCs 520 may be implemented as part of the modem 126.

The wireless transceiver 120 also includes an oscillator circuit 538 (e.g., a local oscillator circuit), which generates a reference signal 524 enabling the mixers 510-1, 518-1, and 518-2 to upconvert or downconvert analog signals within the transmitter 502 or the receiver 504, respectively. In some implementations, the oscillator circuit 538 includes two oscillators and a selection circuit. The two oscillators can include a local oscillator, which generates a local oscillator signal having a continuous tone, and a frequency-varying local oscillator (e.g., a voltage-controlled oscillator), which generates a frequency-modulated signal or other signal which varies in frequency. During operation, the selection circuit selectively passes the frequency-varying signal or the local oscillator signal as the reference signal 524. An example of an oscillator circuit 538 that includes two oscillators and a selection circuit is described below with reference to FIG. 6. The transmitter 502 and the receiver 504 can also include other additional components that are not depicted in FIG. 5, such as filters (e.g., low-pass filters or band-pass filters), phase shifters, additional mixers, switches, and so forth.

During wireless communication 132, the wireless transceiver 120 can transmit the uplink signal 202 or receive the downlink signal 204 (of FIGS. 2 and 3). In particular, for transmission, the signal generator 506 generates the transmit signal 522, which includes communication data for wireless communication 132. The digital-to-analog converter 508 converts the transmit signal 522 from the digital domain to the analog domain. The oscillator circuit 538 generates the local oscillator signal as the reference signal 524. The mixer 510-1 upconverts the transmit signal 522 to radio frequencies using the reference signal 524. The amplifier 512-1 amplifies the radio-frequency transmit signal 522, and the antenna 122-1 transmits the amplified transmit signal 522 as the uplink signal 202 (of FIGS. 2 and 3).

During wireless communication 132, the antenna 122-2 can receive the downlink signal 204 (of FIG. 2). At least one of the receive channels within the receiver 504 processes the downlink signal 204. For example, the amplifier 516-1 amplifies the downlink signal 204, and the mixer 518-1 downconverts the amplified downlink signal 204 using the reference signal 524, which is the local oscillator signal for wireless communication 132 in this scenario. The analog-to-digital converter 520-1 converts the downlink signal 204 from the analog domain to the digital domain to produce a receive signal 526-1. The digital version of the downlink signal 204 can be passed to the modem 126 or a data processor in the modem for further processing. Although not explicitly depicted this way in FIG. 5, the jammer detection module 124 or the proximity detection module 530, including both based on a permitted inclusive-or interpretation of the disjunctive "or," can be bypassed during wireless communication 132.

During proximity detection 134, the transmitter 502 generates the radar transmit signal 208 via the antenna 122-1. In particular, the signal generator 506 can generate the transmit signal 522, which can include a single continuous tone. The digital-to-analog converter 508 converts the transmit signal 522 from the digital domain to the analog domain. The oscillator circuit 538 generates the frequency-modulated signal as the reference signal 524. The mixer 510-1 upconverts and modulates the analog transmit signal 522 using the reference signal 524—e.g., to produce a frequency-modulated radio-frequency transmit signal 522. The amplifier 512-1 amplifies this transmit signal 522, and the antenna 122-1 transmits the amplified transmit signal 522 as the radar transmit signal 208.

The antenna 122-2 can receive the radar receive signal 210, which may include a reflected signal 216, or a reflected signal component. The receiver 504 may receive different versions 540 of the radar receive signal 210 via the antenna 122-2. To do so, the response of the antenna 122-2 can be separated into the versions 540-1 and 540-2 via two feed ports (not explicitly shown). Using the mixers 518-1 and 518-2, the channels 514-1 and 514-2 of the receiver 504 demodulate the radar receive signal 210 using the reference signal 524. As a result of the mixing operations, the mixers 518-1 and 518-2 produce down-converted radar receive signals that propagate as receive signals 526-1 and 526-2, respectively. These receive signals 526-1 and 526-2 may be converted into digital versions of the signals 526-1 and 526-2 using the ADCs 520-1 and 520-2, respectively, as shown.

The receive signals 526-1 and 526-2 can include a beat frequency, which is indicative of a frequency offset between the radar transmit signal 208 and the radar receive signal 210. The beat frequency may have one or more components or characteristics that are indicative of a range to the object 206 that are determinable by the proximity detection module 530. The radar receive signal 210, and a resulting receive signal 526, may also or instead include a direct coupling component caused by a direct coupling signal 528 that propagates between the antenna 122-1 and the antenna 122-2 within or outside of a housing a computing device.

In other implementations, a signal received at the antenna 122-2, and a resulting receive signal 526, may include a jamming signal 218. The jammer detection module 124 can detect the jamming signal 218 in the receive signal 526 as described herein. In response to a jamming signal detection, the jammer detection module 124 can generate and output a jammer indication 542, such as an affirmative jammer detection signal and/or a jammer frequency indication. Otherwise, the jammer detection module 124 may generate and output the jammer indication 542 for a negative jammer detection signal. A transmission (TX) control module 532 can receive the jammer indication 542. In this way, the jammer detection module 124 can control, at least partially, EM signaling emanations or adjustable signal-processing capabilities (e.g., a degree of filtering) in the presence or absence of a jamming signal 218.

In FIG. 5, the modem 126 includes at least one proximity detection module 530 and at least one transmitter control module 532 (TX control module 532). Although not shown in FIG. 5, the modem 126 can include other components, such as the jammer detection module 124. The proximity detection module 530 can obtain at least one receive signal 526 and generate an object indication 534, which indicates whether or not an object 206 is detected. The object indication 534 can also include a range to a detected object 206.

Based on the jammer indication 542 or the object indication 534, the transmitter control module 532 can generate at least one transmission parameter 536 that controls one or more transmission attributes for wireless communication 132. The transmission parameter 536 can specify one or more transmission-related aspects of the uplink signal 202, such as a power level, polarization, frequency, duration, beam shape, beam steering angle, a selected antenna that transmits the uplink signal 202 (e.g., another antenna that is on a different surface of the computing device 102 and is not obstructed by the object 206 or interfered with by a jamming signal 218), or combinations thereof. Some transmission parameters 536 may be associated with beam management, such as those that define an unobstructed volume of space for beam sweeping.

By specifying the transmission parameter 536, the modem 126 can, for example, cause the transmitter 502 to decrease power if an object 206 is close to the computing device 102 or increase power if the object 206 is at a farther range or is not detectable. The ability to detect the object 206 and control the transmitter 502 enables the modem 126 to balance the performance of the computing device 102 with regulatory compliance guidelines. In other implementations, the application processor 108 or another component (e.g., a sensors hub) can perform one or more of these functions and include the proximity detection module 530 and/or the jammer detection module 124. The modem 126 can also adjust at least one transmission parameter 536 in similar or different manners if a jamming signal 218 is detected by the jammer detection module 124 and/or if a jammer frequency determiner 128 thereof determines a frequency of the jamming signal 218.

Although not explicitly shown, multiple antennas 122 can be used to sense additional versions 540 of the radar receive signal 210 (e.g., a third version or a fourth version) or another received signal (e.g., a potential jamming signal) and provide additional receive signals 526 (e.g., a third receive signal 526 or a fourth receive signal 526) to the jammer detection module 124 or the proximity detection module 530. For example, two or more patch antennas may be used to receive the radar receive signal 210. With multiple received signals 526, the computing device 102 can increase a probability of detecting an object 206 (or accurately determining a range thereof), increase an accuracy of a jamming-signal detection operation (or accurately determining a frequency thereof), or decrease a probability of false alarms. The transmitter control module 532 can also make different adjustments based on which one or more antennas 122 or what quantity or polarization of antennas 122 detect an object 206 or a jamming signal 218. In some cases, these adjustments may impact beam management by focusing available beams or targeting a spatial area for beam determination or adjusting a polarization for transmission.

With respect to proximity detection, in some situations, the object 206 may be closer to one of the antennas 122 than another, which enables the one antenna 122 to detect the object 206 while the other antenna 122 is unable to detect the object 206. In this case, the transmitter control module 532 can decrease a transmit power of the antenna 122 that detected the object 206 relative to the other antenna 122. In some implementations, the multiple antennas 122 can be used to further characterize the relationship between the object 206 and the antennas 122, such as by using triangulation or digital beamforming to estimate an angle to the object 206. In this way, the transmitter control module 532 can adjust the transmission parameter 536 to steer the uplink signal 202 away from the object 206. In general, the proximity detection module 530) can detect one or more objects using at least one receive signal 526 obtained from the receiver 504.

With respect to jammer detection, in some situations, a jamming signal 218 can interfere more with one of the antennas 122 than another, which may enable the one antenna 122 to detect the jamming signal 218 while the other antenna 122 is unable to detect the jamming signal 218. In this case, the transmitter control module 532 can decrease a reception focus of the antenna 122 that detected the jamming signal 218 relative to the other antenna 122 for future signal receptions, including switching to the other antenna 122. In some implementations, the multiple antennas 122 can be used to further characterize the relationship between the jamming signal 218 and the antennas 122, such as by using triangulation or digital beamforming to estimate an angle of incidence at the antenna array 212 and/or a direction of origination of the jamming signal 218. In this way, the transmitter control module 532 can adjust the transmission parameter 536 to steer the uplink signal 202 away from interference caused by the jamming signal 218. In general, the jammer detection module 124 can detect one or more jamming signals 218 using at least one receive signal 526 obtained from the receiver 504. Additional operations of the jammer detection module 124 are described with respect to FIGS. 7 to 11.

Figure 6:
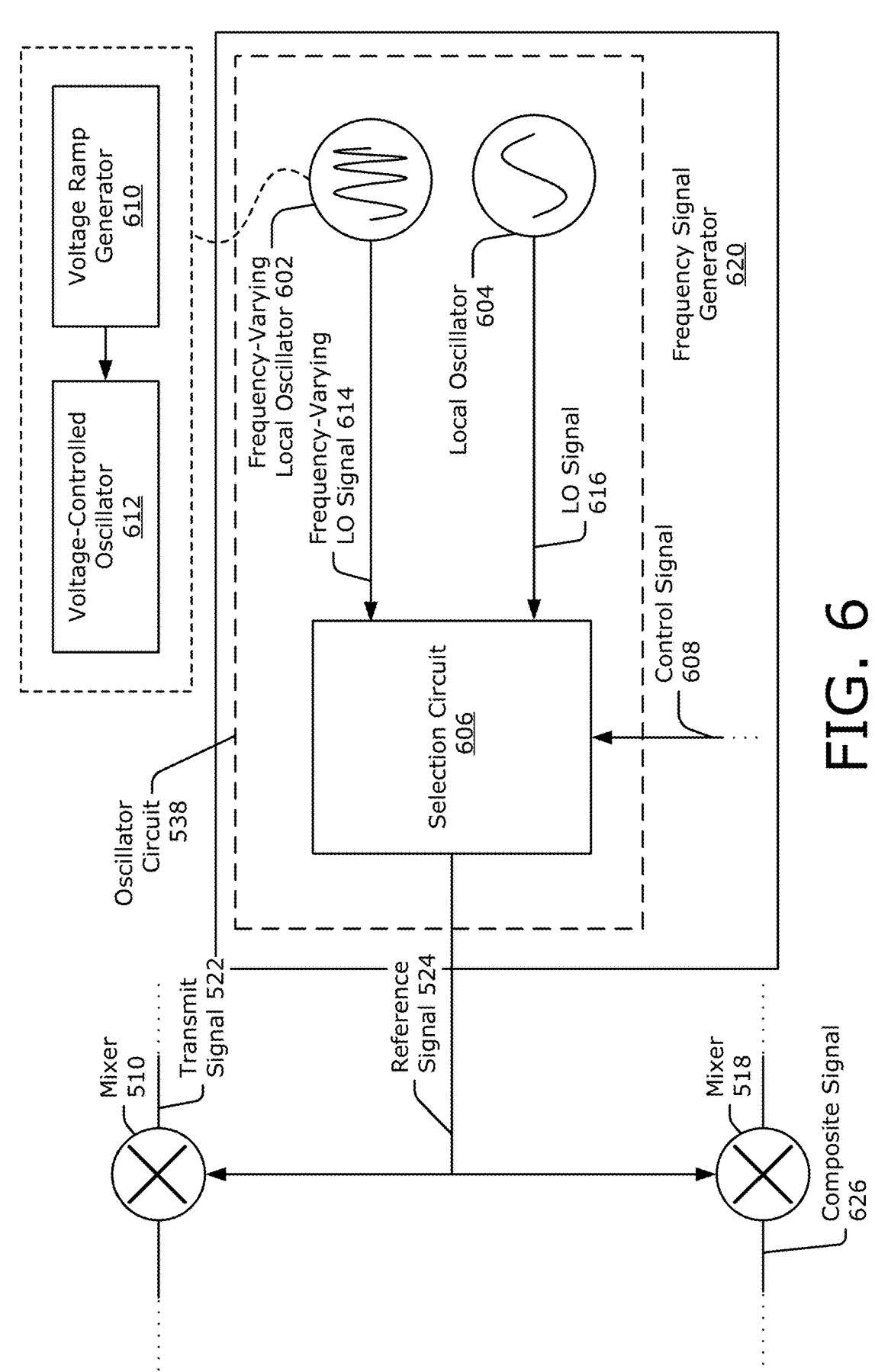
FIG. 6 illustrates an example frequency signal generator having an oscillator circuit for supporting wireless communication in conjunction with jammer detection or proximity detection.

FIG. 6 illustrates an example frequency signal generator 620 having an oscillator circuit 538 for supporting wireless communication 132 in conjunction with jammer detection 130 or proximity detection 134. In the depicted configuration, the oscillator circuit 538 includes a frequency-varying local oscillator 602, a local oscillator 604, and a selection circuit 606. The frequency-varying local oscillator 602 can be implemented using, for instance, a voltage ramp generator 610 and a voltage-controlled oscillator 612. As an example, the voltage-controlled oscillator 612 can be implemented using a wideband open-loop voltage-controlled oscillator. By controlling an input voltage to the voltage-controlled oscillator 612, the voltage ramp generator 610 can provide a variety of different voltage ramps to enable the voltage-controlled oscillator 612 to generate a variety of different frequency-modulated local oscillator signals, which are an example of frequency-varying local oscillator signals 614. Examples of frequency-modulated local oscillator signals include a linear frequency-modulated (LFM) signal, a sawtooth frequency-modulated signal, a triangular frequency-modulated signal, and so forth. At least some of such frequency-modulated local oscillator signals can be used for radar signaling to perform proximity detection 134.

More generally, however, the frequency-varying local oscillator 602 can produce a frequency-varying LO signal 614. In addition to a frequency-modulated LO signal, a frequency-varying LO signal 614 can include other types of frequency-varying waveforms that are produced with other components besides the voltage-controlled oscillator 612 or the voltage ramp generator 610. Examples of other types of frequency-varying signals include a signal that has discrete frequency periods or buckets (e.g., a signal that stairsteps in frequency), a signal that pulses at different frequencies, and so forth. Thus, a discontinuous frequency-varying signal can correspond to any signal that can vary between or among a targeted number of different frequencies during a given time slot, and such signals can be produced by any corresponding components. Jammer detection 130 can be implemented using a frequency-varying LO signal 614, including but not limited to a frequency-modulated LO signal.

For jammer detection 130 and proximity detection 134, a frequency or frequencies of the frequency-varying local oscillator signal 614 can be the same for each detection in some cases. Alternatively, for other cases, the frequency or frequencies of the frequency-varying local oscillator signal 614 can be different (e.g., completely non-overlapping) frequencies or the bandwidth of one can be different from the other (e.g., one may be a subset of, or overlapping with, another) between operations for jammer detection 130 and proximity detection 134. As described herein, a frequency of the frequency-varying LO signal 614 may be based at least on a potential jamming signal for some implementations of jammer detection 130. A frequency of the frequency-varying LO signal 614 for proximity detection 134, however, may be independent of jamming frequencies of potential jamming signals.

The local oscillator 604 can include, for example, a quartz crystal, an inductor-capacitor (LC) oscillator, an oscillator transistor (e.g., a metal-oxide semiconductor field-effective transistor (MOSFET)), a transmission line, a diode, a piezo-electric oscillator, and so forth. A configuration of the local oscillator 604 can enable a target phase noise and quality factor to be achieved for wireless communication 132. In general, the local oscillator 604 generates a local oscillator signal 616 (LO signal 616) with a (e.g., selectable) steady (e.g., substantially constant) frequency. Although not explicitly shown, the oscillator circuit 538 can also include a phase-lock loop (PLL) or automatic gain-control (AGC) circuit. Either of these components can be coupled to the local oscillator 604 to enable the local oscillator 604 to oscillate at a (e.g., selectable) steady frequency.

The selection circuit 606 can include a switch or a multiplexer that is controlled by the modem 126 (e.g., of FIG. 5). Based on a control signal 608, the selection circuit 606 connects or disconnects the frequency-varying local oscillator 602 or the local oscillator 604 to or from the mixers 510 and 518 (e.g., of FIGS. 5 and 7). If the control signal 608 is indicative of the wireless transceiver 120 performing jammer detection 130, the selection circuit 606 can connect the frequency-varying local oscillator 602 to the mixers 518 to provide the frequency-varying local oscillator signal 614 as the reference signal 524, which may be a frequency-modulated continuous wave (FMCW) signal, a frequency-varying discontinuous signal, etc. for jammer detection 130. In at least some of such cases, this reference signal 524 can form the reference signal 412 (e.g., of FIG. 4). During jammer detection 130, the oscillator circuit 538 can be disconnected from the mixer 510-1 (e.g., via at least one switch (not shown)), or the power amplifier 512-1 can be turned off, including both actions to separate the receiver hardware from possible interactions with the transmitter hardware.

If the control signal 608 is indicative of the wireless transceiver 120 performing proximity detection 134, the selection circuit 606 can connect the frequency-varying local oscillator 602 to the mixers 510 and 518 to provide the frequency-varying local oscillator signal 614 as the reference signal 524, which may be a frequency-modulated signal (e.g., a FMCW signal) for proximity detection 134. Alternatively, if the control signal 608 is indicative of the wireless transceiver 120 performing wireless communication 132, the selection circuit 606 can connect the local oscillator 604 to the mixers 510 and 518 to provide the local oscillator signal 616 as the reference signal 524. The selection circuit 606 enables the wireless transceiver 120 to quickly transition between performing operations for jammer detection 130 or proximity detection 134 and performing operations for wireless communication 132.

Generally, at least for jammer detection 130, the frequency signal generator 620 can generate a reference signal 524 (which corresponds to the reference signal 412 of FIG. 4) with a known correspondence between time and frequency with a changing frequency over time. Accordingly, during analysis, the jammer detection module 124, including the jammer frequency determiner 128 thereof, can ascertain a frequency of the reference signal 524 at a given time, which can be indicated with a time index. In some cases, the reference signal 524 is continuous. In other cases, however, the reference signal 524 can be discontinuous, for example as different frequencies are changed or tuned to for targeting different frequencies for jammer detection 130. In example implementations, the reference signal 524 includes at least one frequency having an association with one or more targeted frequencies of a potential jamming signal, which is described below with reference to FIG. 8.

Although the frequency-varying local oscillator 602 and the selection circuit 606 are shown in FIG. 6, other implementations of the frequency signal generator 620 or the oscillator circuit 538 thereof may not include these components. For example, the local oscillator 604 can provide the local oscillator signal 616 as the reference signal 524 for jammer detection 130 or proximity detection 134 and for wireless communication 132. In this case, for the proximity detection 134, the modem 126 (or a signal generator, such as the signal generator 506, within the wireless transceiver 120) can apply a frequency modulation to the analog baseband signal (e.g., the transmit signal 522) to enable performance of the proximity detection 134.

In other examples, respective LO circuitry for wireless communication 132 and proximity detection 134 or jammer detection 130 can be implemented, and respective reference signals 524 are provided to mixers 510 and/or 518 as shared for wireless communication 132 and proximity or jammer detection 134 or 130, or to respective mixers. FIG. 6 also depicts a composite signal 626 that may be processed in the receive chain, such as a signal corresponding to the receive signal 526 (of FIG. 5). The composite signal 626 can include multiple components, including a jamming signal component, that are received via at least one antenna as part of some signal. Example operations to receive a signal for jammer detection 130 are described next with respect to FIG. 7.

FIG. 7 illustrates additional examples of a wireless transceiver 120 in which a jamming signal 218 can be detected and a jamming frequency thereof can be determined. The wireless transceiver 120 of FIG. 7 can be similar to the wireless transceiver 120 of FIG. 5. Some components, however, are omitted for clarity (e.g., the components of a transmit chain). Further, the example wireless transceiver 120 of FIG. 7 is illustrated as a superheterodyne transceiver having a radio-frequency (RF) portion and an intermediate-frequency (IF) portion. A dividing line 730 shows an example separation between an RF portion on the left (as depicted) and an IF portion on the right. In some cases, the RF and IF portions are realized on separate IC chips: however, the portions may be on a single IC chip or distributed across multiple IC chips in other manners. Further, the principles described herein for jammer detection are applicable to direct conversion architectures.

In example implementations, the wireless transceiver 120 can provide temporal or physical separation between wireless transmissions and a reception for jammer detection 130. For instance, the wireless transceiver 120 can avoid transmitting while receiving a signal to be analyzed for the presence of a jamming signal. Additionally, during jammer detection 130, the oscillator circuit 538 (of FIG. 5) can be disconnected from the mixer 510-1 (e.g., via at least one switch (not separately shown)), or the power amplifier 512-1 can be turned off, including performing both actions to further separate the transmitter hardware from possible interactions with the receiver hardware.

Figure 9:
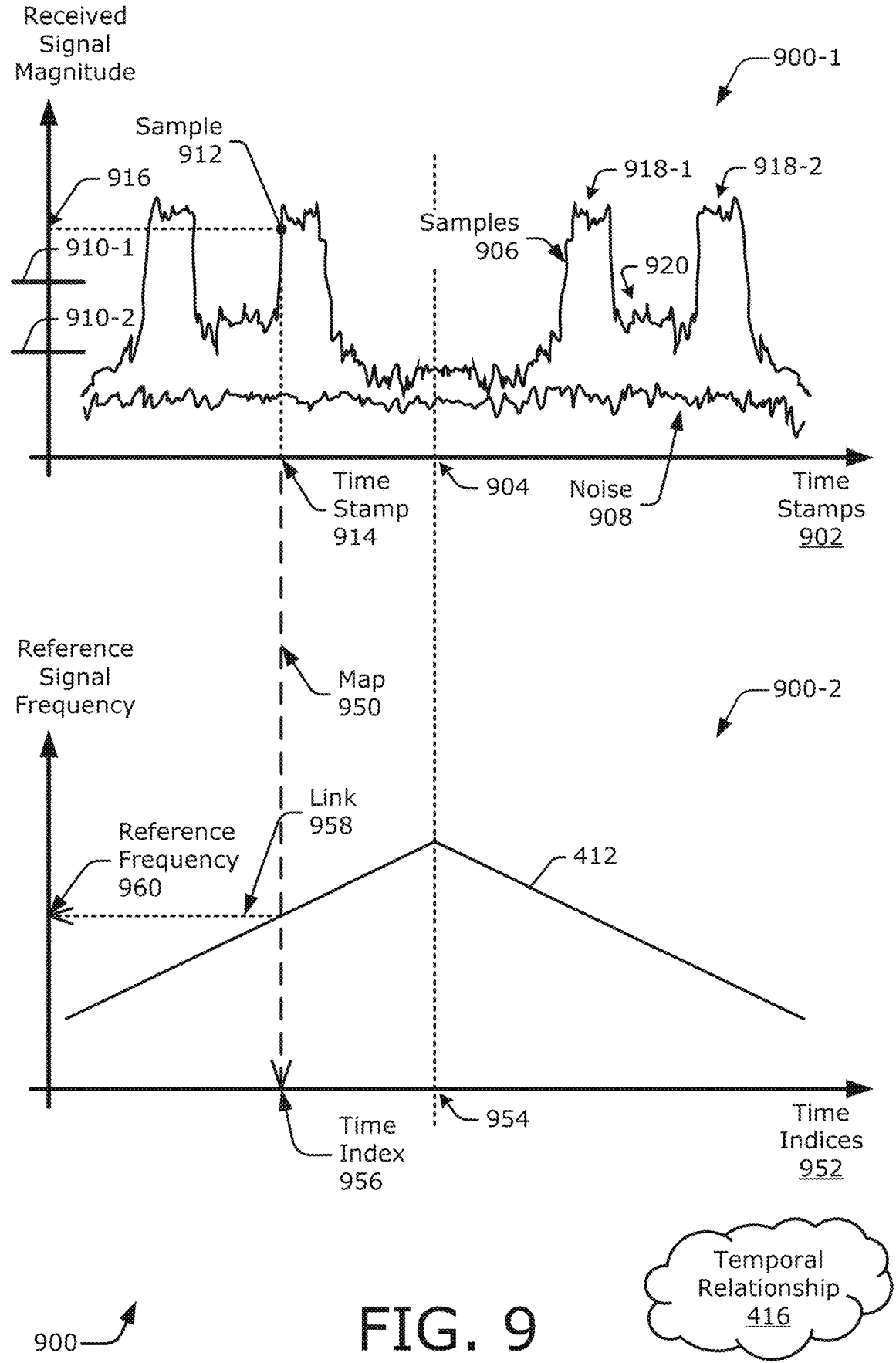
FIG. 9 depicts multiple graphs that illustrate an example temporal relationship between time stamps of multiple samples of a received signal and time indices of an example reference signal.

In example operations for jammer detection 130, a frequency-varying VCO can generate the reference signal 524. FIG. 7 depicts such VCO as a frequency-modulated continuous wave (FMCW) VCO 704 configured to generate the reference signal 524 as a frequency-modulated signal 706, an example of which is depicted in FIG. 7. In accordance with an oscillator circuit 538 implementation (of FIG. 6), this reference signal 524 can correspond to the frequency-varying LO signal 614 (also of FIG. 6). As described above with reference to FIG. 3, the frequency-modulated signal 706 version (or other frequency varying version) of the reference signal 524 can be used for demodulation during a jammer detection mode, which may occur during an uplink random-access channel (UL RACH) slot 708. Thus, the FMCW VCO 704 can provide the reference signal 524 to the receive chain for jammer detection 130. Accordingly, in at least some of such scenarios, the reference signal 524 can realize the reference signal 412, which is shown in FIGS. 4 and 9.

A receive signal 702 can be received via at least one antenna 122. As shown, the antenna includes two ports: a horizontal (H) polarization port and a vertical (V) polarization port. The receiver includes a respective receive chain for each polarization. The analysis for jammer detection 130 can be performed for each receive signal 702 of each respective receive chain. For brevity, this document directly describes operation of one receive chain—the lower one as depicted in FIG. 7 for the vertical polarization signal. Operations on the horizonal polarization signal for jammer detection 130 can be performed analogously. Thus, after reception, the amplifier 516 can accept the received signal 702.

After amplification by the amplifier 516, the mixer 518 can translate the received signal 702 from a first frequency to a second frequency using the reference signal 524 to produce a translated received signal. For instance, the mixer 518 can down convert the received signal 702 using the reference signal 524 from the FMCW VCO 704, which may be a frequency-modulated signal 706. In some cases, the first frequency can be a radio frequency, and the second frequency can be an intermediate frequency of the wireless transceiver 120. The translated received signal is thus passed across the dividing line 730 from the RF portion of the wireless transceiver 120 to the IF portion of the wireless transceiver 120.

A mixer 740 can further translate a frequency of the received signal 702. For example, the mixer 740 can down convert the received signal 702 using a LO signal 710 from the IF local oscillator 742 (IF LO 742) to produce a lower-frequency received signal 702. This lower frequency may correspond to a baseband (BB) frequency. The lower-frequency received signal 702 can be provided to a low-pass filter 744 (LP filter 744). The low-pass filter 744 passes relatively lower frequencies of the translated received signal 702 (e.g., the down-converted received signal 702) to the ADC 520. In some cases, the LP filter 744 can have a cutoff frequency that is substantially similar to (e.g., within 20 percent (20%), 10%, 5%, or even 3% of) the baseband frequency of the wireless transceiver 120.

The ADC 520 can convert at least a version of the translated received signal 702 (e.g., a version that has been frequency translated, such as down converted, at least once and may have been filtered, amplified, etc.) in the analog domain into a converted received signal in the digital domain. For example, in a superheterodyne architecture, the ADC 520 can convert the received signal 702 after at least two frequency translation operations from an analog version to a digital version that includes multiple samples of the received signal 702. Each sample may have or otherwise be associated with a time stamp. As shown, the ADC 520 may provide the digital received signal 702 to a decision feedback equalizer 746 (DFE 746) for equalization.

The decision feedback equalizer 746 can equalize the converted received signal 702 to reduce inter-symbol distortion. If a decision feedback equalizer 746 is present and is applied to the receive signal, the equalized received signal 702 can be provided to a signal processor 748. The signal processor 748 can perform jammer detection 130, such as by including or otherwise realizing the jammer detection module 124. Thus, the signal processor 748 can detect if the converted received signal 702 includes a jamming signal 218. The detection can use at least one threshold and be based on an association. The association may be between at least one frequency of the reference signal 524 and one or more targeted frequencies of a potential jamming signal. Examples of a frequency relationship that can establish such an association is described below with reference to FIG. 8.

One or more of the depicted components may be part of a modem 126, including components such as the signal processor 748 or the decision feedback equalizer 746. These components may, however, be part of another processor or circuit (e.g., an application processor 108 or a sensors hub or processor) in other examples. Additionally, one or more of the depicted components, such as the decision feedback equalizer 746, may be omitted in certain implementations. Further, the jammer detection 130 can be performed on signals received from multiple antennas, with or without different polarizations.

Figure 8:
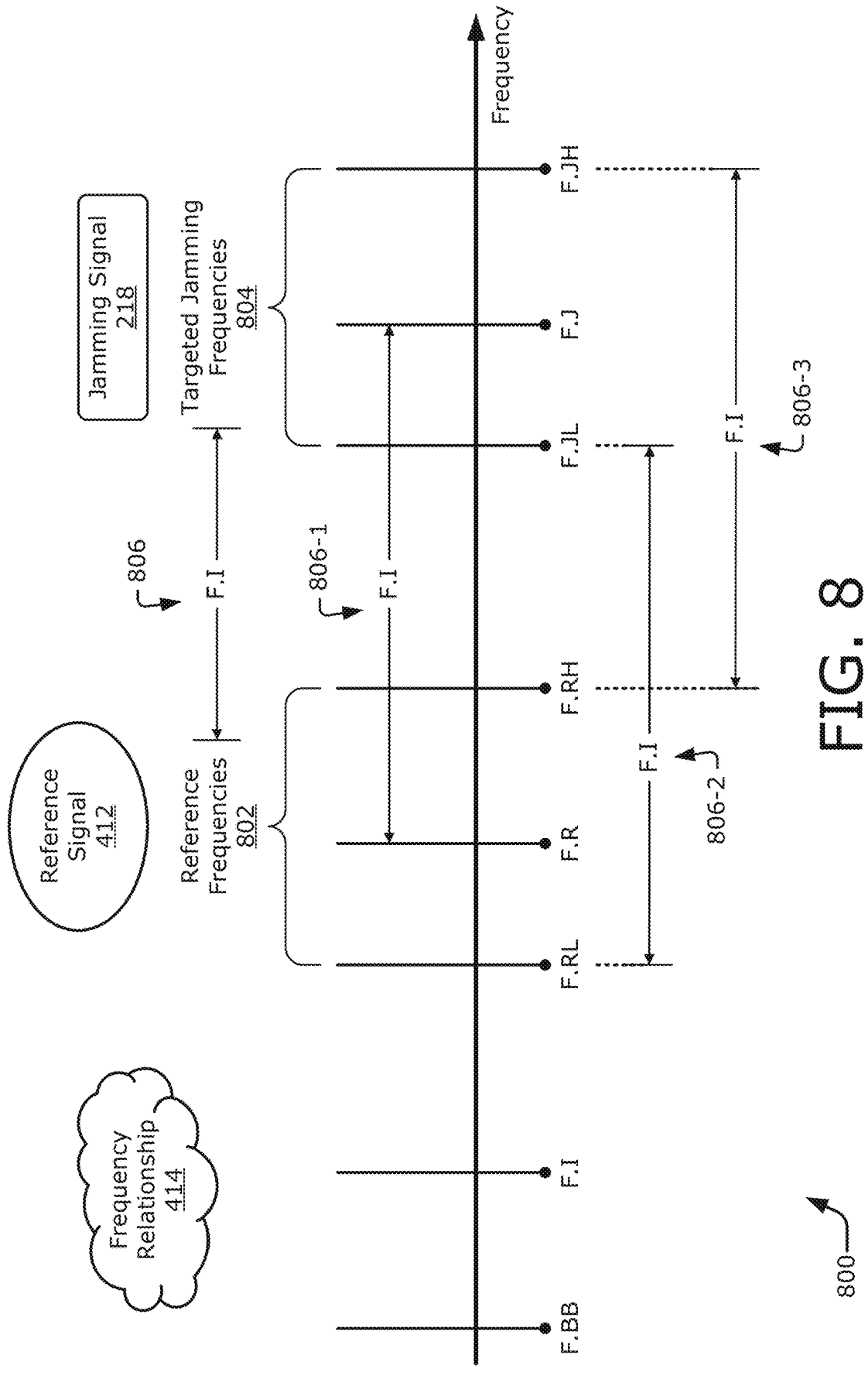
FIG. 8 depicts a graph that illustrates an example frequency relationship between at least one frequency of a reference signal and one or more targeted frequencies of a potential jamming signal.

FIG. 8 depicts a graph 800 that illustrates an example frequency relationship 414 between at least one frequency of a reference signal 412 and one or more targeted frequencies of a potential jamming signal 218. The graph 800 depicts a spectrum of frequencies that increase in the rightward direction as depicted. In example implementations, a frequency association 806 can be created or established between one or more reference frequencies 802 of the reference signal 412 and one or more targeted jamming frequencies 804 of the jamming signal 218. As described above, the reference signal 412 can be realized as the reference signal 524 (e.g., of FIGS. 5-7), which may be produced from the frequency-varying LO signal 614 (of FIG. 6)—e.g., as a frequency-modulated LO signal in some cases.

As illustrated in the graph 800 for some aspects, a baseband frequency (F.BB) is depicted as having a lower frequency than an intermediate frequency (F.I). The targeted jamming frequencies 804 can include a range of frequencies between a low jamming frequency (F.JL) and a high jamming frequency (F.JH). More generally, the targeted jamming frequencies 804 may include at least one jamming frequency (F.J) of the jamming signal 218, including one or more targeted frequencies of a potential jamming signal 218. As described herein, frequencies may be targeted for jamming detection if, for example, the frequencies may impact reception, transmission, or processing of a desired signal in at least a BB portion, an IF portion, or an RF portion of a wireless transceiver 120.

The frequency association 806 between the targeted jamming frequencies 804 and the reference frequencies 802 can determine, at least partly, the reference frequencies 802 for the reference signal 412, or vice versa. The reference frequencies 802 can include a range of frequencies between a low reference frequency (F.RL) and a high reference frequency (F.RH). More generally, the reference frequencies 802 may include at least one reference frequency (F.R) of the reference signal 412.

The frequency association 806-1 can relate the at least one jamming frequency (F.J) to the at least one reference frequency (F.R). Similarly, the frequency association 806-2 can relate the low jamming frequency (F.JL) to the low reference frequency (F.RL). Further, the frequency association 806-3 can relate the high jamming frequency (F.JH) to the high reference frequency (F.RH). In some aspects, the frequency association 806 may entail a difference between the at least one reference frequency (F.R) of the reference frequencies 802 and the at least one jamming frequency (F.J) of the targeted jamming frequencies 804. For example, a difference between a jamming frequency (F.J) and the intermediate frequency (F.I) can substantially equal a corresponding reference frequency (F.R).

In some cases, the intermediate frequency (F.I) may be established before the reference frequencies 802. In other cases, the reference frequencies 802 may be established before the intermediate frequency (F.I). In any of such cases, if one frequency is established first, the other frequency may be established accordingly. Additionally or alternatively, the reference frequencies 802 and the intermediate frequency (F.I) (and/or the targeted jamming frequencies 804) may be established jointly.

In these example manners, a potential jamming signal 218 having one or more targeted jamming frequencies 804 can "land" at the IF of the wireless transceiver 120 responsive to being down converted by the reference signal 412 having the one or more reference frequencies 802. After conversion from the intermediate frequency (F.I) to the baseband frequency (F.BB), if a jamming signal 218 is being received at the one or more targeted jamming frequencies 804 (e.g., at a targeted frequency 804 corresponding to a reference frequency 802 that is used for frequency translation at a given moment), the jamming signal 218 can also be present in the (filtered) baseband receive signal. Further, the jamming signal 218 can be present in the multiple samples of a digital version of the baseband receive signal. These multiple samples can be analyzed for jammer detection and jammer frequency determination as further described with reference to FIG. 9.

The frequencies and frequency ranges depicted in the graph 800 can be realized with numerous different frequencies of the EM spectrum. By way of example only, the targeted jamming frequencies 804 of a potential jamming signal 218 may range between 24 and 28 GHZ. If, for instance, an intermediate frequency of a transceiver is 8 GHZ, then an example frequency association 806 of the frequency relationship 414 can establish a frequency range for the reference frequencies 802 of the reference signal 412 of between 16 and 20 GHZ, respectively.

FIG. 9 depicts, at 900 generally, multiple graphs that illustrate an example temporal relationship 416 between multiple time stamps 902 of multiple samples 906 of a received signal and multiple time indices 952 of an example reference signal 412. The multiple graphs 900 depict an example approach to aligning multiple samples 906 of a converted received signal with the reference signal 412 using multiple time stamps 902 corresponding to the multiple samples 906 and multiple time indices 952 of the reference signal 412. In a graph 900-1, for a received signal 702 (of FIG. 7), a magnitude (or amplitude) of the received signal is graphed along the y-axis versus the multiple time stamps 902 along the x-axis. In a graph 900-2, time is depicted along the x axis, and frequency is depicted along the y-axis. Specifically, one or more reference frequencies 802 (e.g., of FIG. 8) are graphed versus multiple time indices 952. In some cases, the multiple time indices 952 span a time period over which the reference signal 412 has multiple frequencies (e.g., from a low reference frequency (F.RL) to a high reference frequency (F.RH) (of FIG. 8)) including the at least one frequency (e.g., the reference frequency (F.R) (of FIG. 8) or the reference frequency 960).

In some implementations, as shown in the graph 900-2, the reference signal 412 can be generated as an example frequency-modulated signal that increases in frequency until a peak frequency value at time index 954 and that then decreases in frequency. With respect to the graph 900-1 in conjunction with the graph 900-2, the multiple samples 906 of the converted received signal can be aligned with the reference signal 412 using the multiple time stamps 902 of the digital received signal and the multiple time indices 952 of the reference signal 412. As shown in the graph 900-1, the multiple samples 906 may be substantially symmetrical about the dashed line for the time stamp 904, which temporally corresponds to the time index 954. This symmetry can occur, for instance, if the received jamming signal(s) are constant while the frequency of the reference signal 412 is ramping upward and downwards through a cycle. Each sample (e.g., a sample 912) of the multiple samples 906 can include, be derived from, or formed by a sample that is produced based on a low-pass filter that smooths the converted received signal. Additionally or alternatively, each sample of the multiple samples 906 can be produced based on a moving average of three or more samples.

For comparison purposes, example sample values that may be produced in the absence of a jamming signal but in the presence of noise 908 are shown in the graph 900-1. Two example thresholds 910-1 and 910-2 are also shown in the graph 900-1. At least one threshold 910 may be established based on, for example, a full scale or range of an ADC (e.g., the ADC 520 of FIGS. 5 and 7) that produces the multiple samples 906. In the depicted example, the two peaks 918-1 and 918-2 of the multiple samples 906 (on either side of the line at the time stamp 904) are determined to be part of a jamming signal 218 based on the first threshold 910-1 or the second threshold 910-2. The "dip" 920 between the two peaks, however, is determined to be part of a jamming signal 218 based on the second threshold 910-2 but not based on the first threshold 910-1. In other words, the magnitude of the samples in the region of the dip 920 are greater than the second threshold 910-2 but less than the first threshold 910-1. Thresholds may, however, be implemented in alternative manners.

In example operations, the jammer detection module 124 can compare each sample of the multiple samples 906 to at least one threshold 910. If the sample meets (e.g., equals or exceeds) the at least one threshold 910, the sample can be determined to be part of a jamming signal 218. For an example sample 912 of the multiple samples 906 having a magnitude 916, the jammer detection module 124 determines that the sample 912 is part of a jamming signal 218 based on the magnitude 916 meeting the at least one threshold 910. Generally, the multiple samples 906 can correspond to the multiple time stamps 902. Here, the sample 912 has or is associated with a time stamp 914 of the multiple time stamps 902. As used herein, a time stamp 902 can correspond to or be implemented with any indicator of "when" a sample 906 is obtained relative to another sample 906 of a signal being digitized. A time stamp 902 need not reflect a clock time or an absolute time of a device or a wireless system. A time stamp 902 can be realized with any mechanism for associating digitized amplitudes of a received signal with frequencies of a reference signal. Thus, there can be a relative time or index relating to the start of a relevant signal time or frequency change of a frequency varying signal (e.g., a frequency ramp). This may entail explicit times, relative indexing, analyzing of a selected signal duration and then determining where or when in that duration detected amplitude spikes occur, and so forth. Time stamps 902 may also be implemented in other manners or using any combination of the examples presented herein.

In further example operations, the jammer frequency determiner 128 of the jammer detection module 124 implicitly or explicitly aligns the multiple time stamps 902 of the converted translated receive signal with the multiple time indices 952 of the reference signal 412. With such an alignment, the jammer frequency determiner 128 can map 950 the time stamp 914 of the sample 912 to a time index 956 of the multiple time indices 952 for the reference signal 412. This mapping 950 (or mapping operation 950) can use the temporal relationship 416 between the reference signal 412 and the received signal, at least after the received signal is translated from one frequency to another frequency using the reference signal 412. Here, the reference signal 412 can have an ascertainable linkage (e.g., as represented by a link 958) between the at least one frequency (e.g., along the y-axis) and the multiple time indices 952 of the reference signal 412.

To determine the jamming frequency of the sample 912, the jammer frequency determiner 128 links 958 the time index 956 to a reference frequency 960, which corresponds to at least one frequency of the reference frequencies 802 (of FIG. 8). With reference also to FIG. 8, the jammer frequency determiner 128 can use the frequency relationship 414 to determine the jamming frequency of the jamming signal 218 based on the reference frequency that is ascertained via the linking 958 (or linking operation 958).

This determination of the jamming frequency can also be based on a frequency association 806 between the reference frequencies 802 and the targeted jamming frequencies 804. In some cases, this frequency association 806 can involve a frequency of a local oscillator signal for an IF portion of the transceiver. For example, the jammer frequency determiner 128 can determine the jammer frequency of the jamming signal 218 by adding the intermediate frequency to the reference frequency that is linked to the mapped time index 956. By way of example only, if the IF is 8 GHZ, and the ascertained reference frequency is 18 GHZ at the mapped time index 956, then the jammer frequency can be determined to be 26 GHZ at the time stamp 914 for the sample 912. Further, depending on which receive chain was used, a polarization of the jammer may be determined.

Figure 10:
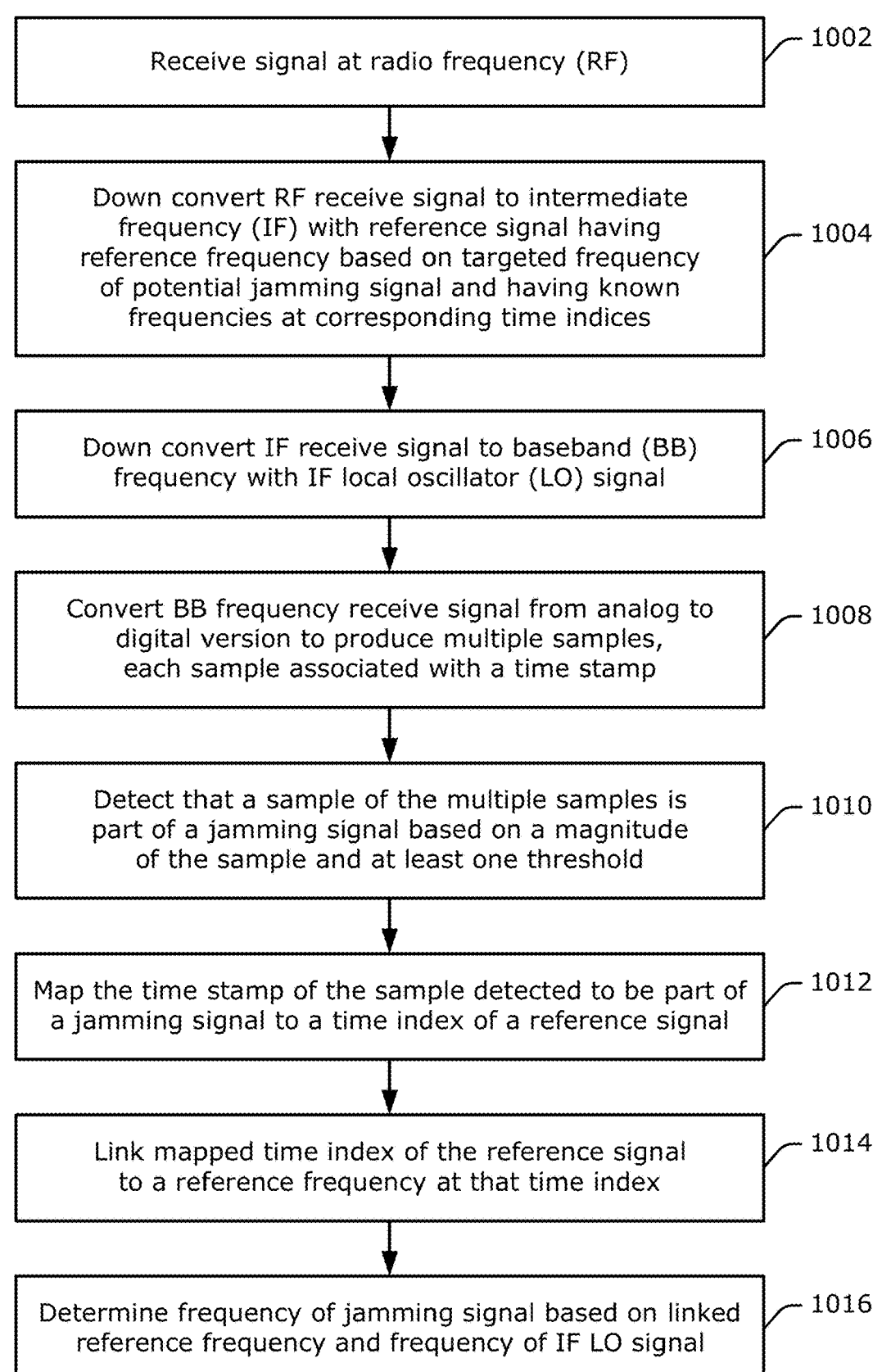
FIG. 10 is a flow diagram illustrating an example process for detecting a jamming signal and determining a frequency thereof.
Figure 11:
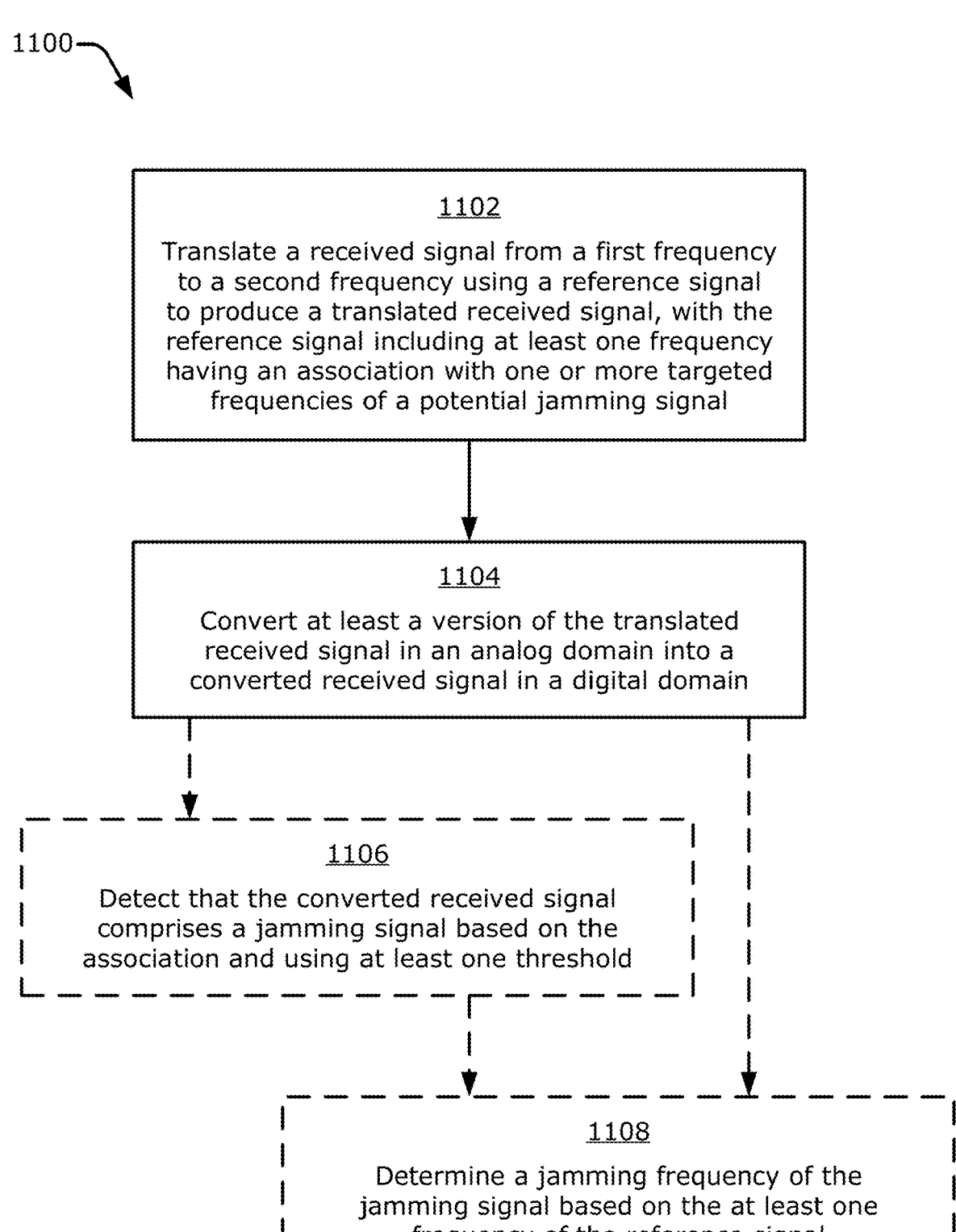
FIG. 11 is a flow diagram illustrating an example process for detecting a jamming signal and/or determining a frequency thereof.

FIGS. 10 and 11 are flow diagrams illustrating example processes for jammer detection. Each process is described in the form of a set of blocks that specify operations that can be performed. However, operations are not necessarily limited to the order shown in the figures or described herein, for the operations may be implemented in alternative orders or in fully or partially overlapping manners. Also, more, fewer, and/or different operations may be implemented to perform a respective process or an alternative process. The descriptions of these flow diagrams reference other figures by way of example only.

FIG. 10 is a flow diagram illustrating an example process 1000 for detecting a jamming signal and determining a frequency thereof. The process 1000 includes eight blocks 1002-1016 that specify operations that can be performed for at least one method. In example implementations, at operation 1002, a wireless transceiver 120 can receive a radio frequency (RF) signal 702.

At operation 1004, a first mixer 518 can down convert the RF receive signal 702 to an intermediate frequency (IF) with a reference signal 412 (e.g., the reference signal 524 of FIGS. 5 and 7) having a reference frequency based on a targeted frequency of a potential jamming signal 218 (e.g., in accordance with a frequency relationship 414) and having known frequencies at corresponding time indices (e.g., as shown at the graph 900-2 of FIG. 9). At operation 1006, a second mixer can down convert the IF receive signal 702 to a baseband (BB) frequency with an IF local oscillator (LO) signal 710 from the IF LO 742.

At operation 1008, an ADC 520 can convert the BB frequency receive signal 702 from an analog version to a digital version to produce multiple samples 906, with each sample associated with a time stamp of multiple stamps 902.

At operation 1010, a jammer detection module 124 can detect that a sample 912 of the multiple samples 906 is part of a jamming signal 218 based on a magnitude 916 of the sample 912 and at least one threshold 910.

At operation 1012, a jammer frequency determiner 128 of the jammer detection module 124 can map 950 the time stamp 914 of the sample 912 that is detected to be part of a jamming signal 218 to a time index 956 of a reference signal 412 using a temporal relationship 416 between the two signals as shown by the graphs 900 of FIG. 9. The temporal relationship 416 can align (or enable an alignment) between the multiple samples 906 and the reference signal 412 using the multiple time stamps 902 and the multiple time indices 952. At operation 1014, the jammer frequency determiner 128 can link 958 the mapped time index 956 of the reference signal 412 to a reference frequency 960 at that time index 956.

At operation 1016, the jammer frequency determiner 128 can determine a frequency of the jamming signal 218 based on the linked reference frequency 960 and a frequency of the IF LO signal 710. In some cases, a frequency association 806 relating reference frequencies 802 to targeted jamming frequencies 804 may be used to determine the jammer frequency from the linked reference frequency 960. This frequency association 806 may be based, at least partially, on the frequency of the IF LO signal 710 as indicated by the frequency distance (as marked by "F.I" in FIG. 8) between a respective jamming frequency (F.J) of the targeted jamming frequencies 804 and a respective reference frequency (F.R) of the reference frequencies 802. The determination of the jamming frequency may entail an addition operation including the reference frequency 960 and the intermediate frequency (IF).

FIG. 11 is a flow diagram illustrating an example process 1100 for detecting a jamming signal and/or determining a frequency thereof. The process 1100 includes four blocks 1102-1108 that specify operations that can be performed for at least one method.

At block 1102, a received signal is translated from a first frequency to a second frequency using a reference signal to produce a translated received signal, with the reference signal including at least one frequency having an association with one or more targeted frequencies of a potential jamming signal. For example, a wireless transceiver 120 can translate a received signal 702 from a first frequency to a second frequency using a reference signal 412 to produce a translated received signal 702. The reference signal 412 can include at least one frequency (F.R) having an association (e.g., a frequency association 806) with one or more targeted frequencies (F.J) of a potential jamming signal 218.

For instance, at least one mixer 518 may down convert the received signal 702 from radio frequency (RF) to intermediate frequency (IF) using a reference signal 524 that is generated as or with a frequency-varying LO signal 614. The association may include a selected difference between the at least one frequency of the reference signal 412 and the one or more targeted frequencies (F.J) of the potential jamming signal 218. The association between the at least one frequency (F.R) of the reference signal 412 and one or more targeted jamming frequencies (F.JL to F.JH) may be based on an intermediate frequency (F.I), such as a difference between the frequencies substantially equals the intermediate frequency of an intermediate frequency portion of the wireless transceiver 120.

At block 1104, at least a version of the translated received signal in an analog domain is converted into a converted received signal in a digital domain. For example, the wireless transceiver 120 can convert at least a version of the translated received signal 702 in the analog domain into a converted received signal 702 in the digital domain. In some cases, an ADC 520) may perform the conversion and institute a domain division between the analog domain and the digital domain.

At block 1106, the converted received signal is detected to comprise a jamming signal based on the association and using at least one threshold. For example, the wireless transceiver 120 can detect that the converted received signal 702 comprises a jamming signal 218 based on the association (e.g., the frequency association 806) and using at least one threshold 910. To do so, a jammer detection module 124 may compare each sample (e.g., a sample 912) of multiple samples 906 to at least one threshold 910. If the sample 912 meets the threshold 910, the jammer detection module 124 may designate the sample 912 as being part of a jamming signal 218 because, at least in part, the frequency association 806 produces the multiple samples 906 to correspond to a span of frequencies of the targeted jamming frequencies 804.

At block 1108, a jamming frequency of the jamming signal is determined based on the at least one frequency of the reference signal. For example, the wireless transceiver 120 can determine a jamming frequency (F.J) of the jamming signal 218 based on the at least one frequency (F.R) of the reference signal 412. Here, a jammer frequency determiner 128 may determine the jamming frequency (F.J) of the jamming signal 218 using the frequency relationship 414. This may be performed by using the temporal relationship 416 between the converted received signal and the reference signal 412 to ascertain a corresponding reference frequency 960 and by using the frequency relationship 414 to determine the jamming frequency (F.J) from the reference frequency 960.

In some implementations for jammer signal detection, methods may include performing the operations of blocks 1102, 1104, and 1106. In some implementations for jammer frequency determination, methods may include performing the operations of blocks 1102, 1104, and 1108. In some of such jammer frequency determination implementations, jamming signal detection may be performed in manners that differ from that of block 1106. In other implementations, methods may include performing the operations of blocks 1102, 1104, 1106, and 1108.

If a jamming signal is detected and a corresponding jamming frequency is determined, the jamming signal can be accommodated based on the jamming frequency. For example, the wireless transceiver can reduce at least one measure that is used to counteract a potential jamming signal if a determined jamming frequency will not interfere with a desired signal. For instance, the wireless transceiver can lower an amount of signal filtering based on the jamming frequency. If the jamming signal is not likely to interfere with a desired signal based on frequency differences between the two signals, a filter (e.g., a baseband filter) can be dialed back to save power. To do so, a quantity of poles employed by the filter can be reduced, or the filter can be bypassed in some circumstances.

Additionally or alternatively, a sampling rate (Fs) of an analog-to-digital converter (ADC) can be lowered. The lowering of the sampling rate can reduce power consumption in the ADC or in the digital signal processor that processes the samples, including in the ADC and in the digital signal processor. In some cases, the sampling rate may be lowered to the Nyquist rate. In another example countermeasure, a first communication can be switched from a first frequency to another frequency to avoid or reduce interference with a second frequency of a second communication (and/or the second communication may be switched to a different second frequency). If a jamming frequency (e.g., a harmonic of a first frequency, which may be in FR1) of a jamming signal of a first communication is causing interference on frequencies (e.g., a second frequency, which may be in FR2) that are being used in a second communication, the system (e.g., the detecting device or another device in communication with the detecting device) may be able to switch the first communication from the first frequency to another frequency, switch the second communication from the second frequency to another frequency, cease or temporarily pause communication on the first frequency, and/or cease or temporarily pause communication on the second frequency. In some cases, the interfering frequency may be a harmonic of one signal of one communication that "lands" in the intermediate frequency (IF) range of another communication. Further, in some of such cases, a wireless transceiver may adjust an intermediate frequency of a receive chain to avoid interference from a jamming signal. More specifically, the wireless transceiver may adjust the intermediate frequency used to down convert data signals such that an FR1 jammer no longer "lands" in the frequency of interest for a down converted FR2 signal (e.g., such that the FR1 jammer, which may be a harmonic of an FR1 signal, no longer conflicts with an IF of the down converted FR2 signal).

This section describes some aspects of example implementations and/or example configurations related to the apparatuses and/or processes presented above.

Example aspect 1: An apparatus comprising:

a wireless transceiver configured to be connected to one or more antennas, the wireless transceiver configured to:

translate a received signal from a first frequency to a second frequency using a reference signal to produce a translated received signal, the reference signal including at least one frequency having an association with one or more targeted frequencies of a potential jamming signal;

convert at least a version of the translated received signal in an analog domain into a converted received signal in a digital domain;

detect that the converted received signal comprises a jamming signal based on the association and using at least one threshold; and determine a jamming frequency of the jamming signal based on the at least one frequency of the reference signal.

Example aspect 2: The apparatus of example aspect 1, wherein the association comprises a selected difference between the at least one frequency of the reference signal and the one or more targeted frequencies of the potential jamming signal.

Example aspect 3: The apparatus of example aspect 1 or example aspect 2, wherein the association comprises a relationship among the at least one frequency of the reference signal, the one or more targeted frequencies of the potential jamming signal, and a frequency of a local oscillator of an intermediate frequency portion of the wireless transceiver.

Example aspect 4: The apparatus of example aspect 3, wherein the association relates (i) a difference between the at least one frequency of the reference signal and the one or more targeted frequencies of the potential jamming signal to (ii) the frequency of the local oscillator of the intermediate frequency portion of the wireless transceiver.

Example aspect 5: The apparatus of example aspect 3 or example aspect 4, wherein the wireless transceiver comprises:

a first mixer configured to translate the received signal from the first frequency to the second frequency using the reference signal to produce the translated received signal; and a second mixer configured to translate the translated received signal from the second frequency to a third frequency to produce another translated received signal using a signal from the local oscillator having the frequency of the intermediate frequency portion of the wireless transceiver.

Example aspect 6: The apparatus of example aspect 5, wherein:

the first frequency corresponds to a radio frequency;

the second frequency corresponds to the frequency of the intermediate frequency portion of the wireless transceiver; and the third frequency corresponds to a baseband frequency of the wireless transceiver.

Example aspect 7: The apparatus of example aspect 5 or example aspect 6, wherein the version of the translated received signal that is converted into the converted received signal comprises the other translated received signal produced by the second mixer.

Example aspect 8: The apparatus of any one of the preceding example aspects, wherein the wireless transceiver is configured to:

detect that a sample of multiple samples of the converted received signal is part of the jamming signal, the sample corresponding to a time stamp; and map the time stamp of the sample to a time index of the reference signal, the time index linked to the at least one frequency of the reference signal.

Example aspect 9: The apparatus of example aspect 8, wherein the wireless transceiver is configured to:

determine the jamming frequency of the jamming signal based on a frequency of a local oscillator signal of the wireless transceiver and the at least one frequency of the reference signal corresponding to the time index.

Example aspect 10: The apparatus of any one of the preceding example aspects, wherein:

the converted received signal comprises multiple samples corresponding to multiple time stamps;

the at least one frequency of the reference signal corresponds to a time index of the reference signal; and the wireless transceiver is configured to determine the jamming frequency of the jamming signal using the multiple time stamps of the multiple samples and the time index of the reference signal.

Example aspect 11: The apparatus of example aspect 10, wherein each sample of the multiple samples comprises at least one of:

a sample that is produced based on a low-pass filter that smooths the converted received signal: or a sample that is produced based on a moving average of three or more samples.

Example aspect 12: The apparatus of example aspect 10 or example aspect 11, wherein the wireless transceiver is configured to detect that the converted received signal comprises the jamming signal by:

comparing a magnitude of a sample of the multiple samples to the at least one threshold, the sample corresponding to a time stamp of the multiple time stamps that aligns with the time index of the reference signal.

Example aspect 13: The apparatus of any one of example aspects 10 to 12, wherein the wireless transceiver is configured to:

align the multiple samples of the converted received signal with the reference signal using the multiple time stamps of the converted received signal and multiple time indices of the reference signal, the multiple time indices comprising the time index;

map a time stamp of a sample that is detected to be part of the jamming signal to the time index of the reference signal;

link the time index of the reference signal to the at least one frequency of the reference signal; and determine the jamming frequency of the jamming signal based on the at least one frequency of the reference signal responsive to the linking of the time index.

Example aspect 14: The apparatus of any one of the preceding example aspects, wherein the wireless transceiver is configured to:

determine the jamming frequency of the jamming signal based on the at least one frequency of the reference signal and an intermediate frequency of the wireless transceiver.

Example aspect 15: The apparatus of example aspect 13, wherein the wireless transceiver comprises:

a modem configured to perform the detection, the alignment, the mapping, the linking, and the determination.

Example aspect 16: The apparatus of any one of the preceding example aspects, wherein the reference signal has an ascertainable linkage between the at least one frequency and multiple time indices of the reference signal.

Example aspect 17: The apparatus of example aspect 16, wherein:

the multiple time indices span a time period over which the reference signal has multiple frequencies including the at least one frequency;

the multiple frequencies comprise a frequency range; and the one or more targeted frequencies of the potential jamming signal substantially comprise the frequency range.

Example aspect 18: The apparatus of example aspect 16 or example aspect 17, wherein the wireless transceiver comprises:

a mixer configured to be coupled between at least one antenna of the one or more antennas and a modem; and a signal generator coupled to the mixer and configured to:

generate the reference signal; and couple the reference signal to the mixer to facilitate frequency translation.

Example aspect 19: The apparatus of example aspect 18, wherein the signal generator comprises:

an oscillator circuit comprising:

a selection circuit;

a frequency-varying local oscillator coupled to the selection circuit and configured to generate the reference signal for proximity detection or jammer detection; and a local oscillator coupled to the selection circuit and configured to generate a local oscillator signal for wireless communication.

Example aspect 20: The apparatus of example aspect 19, wherein the wireless transceiver is configured to:

transmit a radar transmit signal using the at least one antenna of the one or more antennas;

receive a radar receive signal via at least one other antenna of the one or more antennas, the radar receive signal associated with the radar transmit signal and comprising a reflection signal component;

frequency translate the radar receive signal using the reference signal generated by the frequency-varying local oscillator to produce a down-converted radar receive signal, the reference signal comprising a frequency-modulated signal; and detect the reflection signal component from the down-converted radar receive signal.

Example aspect 21: The apparatus of any one of the preceding example aspects, wherein the wireless transceiver is configured to:

accommodate the jamming signal based on the jamming frequency.

Example aspect 22: The apparatus of example aspect 21, wherein the wireless transceiver is configured to accommodate the jamming signal by performing at least one of:

reducing at least one countermeasure used to counteract a potential jamming signal based on the jamming frequency;

lowering an amount of signal filtering based on the jamming frequency;

switching a communication from one frequency to another frequency;

adjusting an intermediate frequency of a receive chain; or lowering a sampling rate of an analog-to-digital converter (ADC).

Example aspect 23: An apparatus for jammer detection, the apparatus comprising:

means for translating a received signal from a first frequency to a second frequency using a reference signal to produce a translated received signal, the reference signal including at least one frequency having an association with one or more targeted frequencies of a potential jamming signal;

means for converting at least a version of the translated received signal in an analog domain into a converted received signal in a digital domain;

means for detecting that the converted received signal comprises a jamming signal based on the association and using at least one threshold; and means for determining a jamming frequency of the jamming signal based on the at least one frequency of the reference signal.

Example aspect 24: The apparatus of example aspect 23, further comprising: means for accommodating the jamming signal based on the jamming frequency.

Example aspect 25: A method for jammer detection, the method comprising:

translating a received signal from a first frequency to a second frequency using a reference signal to produce a translated received signal, the reference signal including at least one frequency having an association with one or more targeted frequencies of a potential jamming signal;

converting at least a version of the translated received signal in an analog domain into a converted received signal in a digital domain;

detecting that the converted received signal comprises a jamming signal based on the association and using at least one threshold; and determining a jamming frequency of the jamming signal based on the at least one frequency of the reference signal.

Example aspect 26: The method of example aspect 25, wherein:

the detecting comprises detecting that a sample of multiple samples of the converted received signal is part of the jamming signal, the sample corresponding to a time stamp; and the determining comprises mapping the time stamp of the sample to a time index of the reference signal, the time index linked to the at least one frequency of the reference signal.

Example aspect 27: The method of example aspect 26, wherein the detecting comprises:

comparing a magnitude of the sample of the multiple samples to the at least one threshold.

Example aspect 28: An apparatus comprising:

a wireless transceiver configured to be connected to one or more antennas, the wireless transceiver comprising:

a mixer configured to be coupled between at least one antenna of the one or more antennas and a modem; and a signal generator comprising:

a selection circuit coupled to the mixer:

a frequency-varying local oscillator coupled to the selection circuit and configured to generate a reference signal for proximity detection at a first time and for jammer detection at a second time; and a local oscillator coupled to the selection circuit and configured to generate a local oscillator signal for wireless communication.

Example aspect 29: The apparatus of example aspect 28, wherein:

the frequency-varying local oscillator is configured to produce a frequency-varying signal; and the wireless transceiver is configured to use the selection circuit to route the frequency-varying signal from the frequency-varying local oscillator to the mixer to provide the frequency-varying signal as the reference signal for jammer detection at the second time.

Example aspect 30: The apparatus of example aspect 28 or example aspect 29, wherein:

the frequency-varying local oscillator is configured to produce a frequency-modulated signal; and the wireless transceiver is configured to use the selection circuit to route the frequency-modulated signal from the frequency-varying local oscillator to the mixer to provide the frequency-modulated signal as the reference signal for proximity detection at the first time.

Example aspect 31: The apparatus of any one of example aspects 28 to 30, wherein the wireless transceiver further comprises a power amplifier, and wherein the power amplifier is off during the second time and on during the first time.

As used herein, the terms "couple," "coupled," or "coupling" refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The term "node" (e.g., including a "first node" or a "local oscillator node") represents at least a point of electrical connection between two or more components (e.g., circuit elements). Although at times a node may be visually depicted in a drawing as a single point, the node can represent a connection portion of a physical circuit or network that has approximately a same voltage potential at or along the connection portion between two or more components. In other words, a node can represent at least one of multiple points along a conducting medium (e.g., a wire or trace) that exists between electrically connected components. Similarly, a "terminal" or "port" may represent one or more points with at least approximately a same voltage potential relative to an input or output of a component (e.g., a mixer).

The terms "first," "second," "third," and other numeric-related indicators are used herein to identify or distinguish similar or analogous items from one another within a given context—such as a particular implementation, a single drawing figure, a given component, or a claim. Thus, a first item in one context may differ from a first item in another context. For example, an item identified as a "first sample" in one context may be identified as a "second sample" in another context. Similarly, a "second frequency" or a "first receive signal" in one claim may be recited as a "third frequency" or a "second receive signal," respectively, in a different claim (e.g., in separate claim sets). An analogous interpretation applies to differential-related terms such as a "plus signal component" and a "minus signal component" and to real-imaginary signal parts such as "real (or in-phase) signal data" and "imaginary (or quadrature) signal data."

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description.

Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed. Rather, the specific features and methods are disclosed as example implementations for jammer detection.

What is claimed is:

1. An apparatus comprising:
a wireless transceiver configured to be connected to one or more antennas, the wireless transceiver comprising:
at least one mixer configured to translate a received signal from a first frequency to a second frequency using a reference signal to produce a translated received signal, the reference signal including at least one frequency having a frequency association with one or more targeted frequencies of a potential jamming signal, wherein a range of frequencies of the reference signal does not overlap a range of the one or more targeted frequencies of a potential jamming signal;
a converter configured to convert at least a version of the translated received signal in an analog domain into a converted received signal in a digital domain; and
a jammer detection module configured to detect that the converted received signal comprises a jamming signal based on the frequency association and using at least one threshold,
wherein the jammer detection module includes a jammer frequency determiner configured to determine a jamming frequency of the jamming signal based on the at least one frequency of the reference signal and the frequency association.

2. The apparatus of claim 1, wherein the frequency association comprises a selected difference between the at least one frequency of the reference signal and the one or more targeted frequencies of the potential jamming signal.

3. The apparatus of claim 1, wherein the frequency association comprises a relationship among the at least one frequency of the reference signal, the one or more targeted frequencies of the potential jamming signal, and a frequency of a local oscillator of an intermediate frequency portion of the wireless transceiver.

4. The apparatus of claim 3, wherein the frequency association relates (i) a difference between the at least one frequency of the reference signal and the one or more targeted frequencies of the potential jamming signal to (ii) the frequency of the local oscillator of the intermediate frequency portion of the wireless transceiver.

5. The apparatus of claim 3, wherein the wireless transceiver comprises:
a first mixer configured to translate the received signal from the first frequency to the second frequency using the reference signal to produce the translated received signal; and
a second mixer configured to translate the translated received signal from the second frequency to a third frequency to produce another translated received signal using a signal from the local oscillator having the frequency of the intermediate frequency portion of the wireless transceiver.

6. The apparatus of claim 3, wherein:
the first frequency corresponds to a radio frequency;
the second frequency corresponds to the frequency of the intermediate frequency portion of the wireless transceiver; and
the third frequency corresponds to a baseband frequency of the wireless transceiver.

7. The apparatus of claim 5, wherein the version of the translated received signal that is converted into the converted received signal comprises the other translated received signal produced by the second mixer.

8. The apparatus of claim 1, wherein the wireless transceiver is configured to:
detect that a sample of multiple samples of the converted received signal is part of the jamming signal, the sample corresponding to a time stamp; and
map the time stamp of the sample to a time index of the reference signal, the time index linked to the at least one frequency of the reference signal.

9. The apparatus of claim 8, wherein the wireless transceiver is configured to:
determine the jamming frequency of the jamming signal based on a frequency of a local oscillator signal of the wireless transceiver and the at least one frequency of the reference signal corresponding to the time index.

10. The apparatus of claim 1, wherein:

the converted received signal comprises multiple samples corresponding to multiple time stamps;

the at least one frequency of the reference signal corresponds to a time index of the reference signal; and the wireless transceiver is configured to determine the jamming frequency of the jamming signal using the multiple time stamps of the multiple samples and the time index of the reference signal.

11. The apparatus of claim 10, wherein each sample of the multiple samples comprises at least one of:

a sample that is produced based on a low-pass filter that smooths the converted received signal; or a sample that is produced based on a moving average of three or more samples.

12. The apparatus of claim 10, wherein the wireless transceiver is configured to detect that the converted received signal comprises the jamming signal by:

comparing a magnitude of a sample of the multiple samples to the at least one threshold, the sample corresponding to a time stamp of the multiple time stamps that aligns with the time index of the reference signal.

13. The apparatus of claim 10, wherein the wireless transceiver is configured to:

align the multiple samples of the converted received signal with the reference signal using the multiple time stamps of the converted received signal and multiple time indices of the reference signal, the multiple time indices comprising the time index;

map a time stamp of a sample that is detected to be part of the jamming signal to the time index of the reference signal;

link the time index of the reference signal to the at least one frequency of the reference signal; and determine the jamming frequency of the jamming signal based on the at least one frequency of the reference signal responsive to the linking of the time index.

14. The apparatus of claim 13, wherein the wireless transceiver is configured to:

determine the jamming frequency of the jamming signal based on the at least one frequency of the reference signal and an intermediate frequency of the wireless transceiver.

15. The apparatus of claim 13, wherein the wireless transceiver comprises:

a modem configured to perform the detection, the alignment, the mapping, the linking, and the determination.

16. The apparatus of claim 1, wherein the reference signal has an ascertainable linkage between the at least one frequency and multiple time indices of the reference signal.

17. The apparatus of claim 16, wherein:

the multiple time indices span a time period over which the reference signal has multiple frequencies including the at least one frequency;

the multiple frequencies comprise a frequency range; and the one or more targeted frequencies of the potential jamming signal substantially comprise the frequency range.

18. The apparatus of claim 16, wherein the wireless transceiver comprises:

a mixer configured to be coupled between at least one antenna of the one or more antennas and a modem; and a signal generator coupled to the mixer and configured to:

generate the reference signal; and couple the reference signal to the mixer to facilitate frequency translation.

19. The apparatus of claim 18, wherein the signal generator comprises:

an oscillator circuit comprising:

a selection circuit;

a frequency-varying local oscillator coupled to the selection circuit and configured to generate the reference signal for proximity detection or jammer detection; and a local oscillator coupled to the selection circuit and configured to generate a local oscillator signal for wireless communication.

20. The apparatus of claim 19, wherein the wireless transceiver is configured to:

transmit a radar transmit signal using the at least one antenna of the one or more antennas;

receive a radar receive signal via at least one other antenna of the one or more antennas, the radar receive signal associated with the radar transmit signal and comprising a reflection signal component;

frequency translate the radar receive signal using the reference signal generated by the frequency-varying local oscillator to produce a down-converted radar receive signal, the reference signal comprising a frequency-modulated signal; and detect the reflection signal component from the down-converted radar receive signal.

21. The apparatus of claim 1, wherein the wireless transceiver is configured to:

accommodate the jamming signal based on the jamming frequency.

22. The apparatus of claim 21, wherein the wireless transceiver is configured to accommodate the jamming signal by performing at least one of:

reducing at least one countermeasure used to counteract a potential jamming signal based on the jamming frequency;

lowering an amount of signal filtering based on the jamming frequency;

switching a communication from one frequency to another frequency;

adjusting an intermediate frequency of a receive chain; or lowering a sampling rate of an analog-to-digital converter (ADC).

23. An apparatus for jammer detection, the apparatus comprising:

means for translating a received signal from a first frequency to a second frequency using a reference signal to produce a translated received signal, the reference signal including at least one frequency having a frequency association with one or more targeted frequencies of a potential jamming signal, wherein a range of frequencies of the reference signal does not overlap a range of the one or more targeted frequencies of a potential jamming signal;

means for converting at least a version of the translated received signal in an analog domain into a converted received signal in a digital domain;

means for detecting that the converted received signal comprises a jamming signal based on the frequency association and using at least one threshold; and means for determining a jamming frequency of the jamming signal based on the at least one frequency of the reference signal and the frequency association.

24. The apparatus of claim 23, further comprising:

means for accommodating the jamming signal based on the jamming frequency.

25. A method for jammer detection, the method comprising:

translating a received signal from a first frequency to a second frequency using a reference signal to produce a translated received signal, the reference signal including at least one frequency having a frequency association with one or more targeted frequencies of a potential jamming signal, wherein a range of frequencies of the reference signal does not overlap a range of the one or more targeted frequencies of a potential jamming signal;

converting at least a version of the translated received signal in an analog domain into a converted received signal in a digital domain;

detecting that the converted received signal comprises a jamming signal based on the frequency association and using at least one threshold; and determining a jamming frequency of the jamming signal based on the at least one frequency of the reference signal and the frequency association.

26. The method of claim 25, wherein:

the detecting comprises detecting that a sample of multiple samples of the converted received signal is part of the jamming signal, the sample corresponding to a time stamp; and the determining comprises mapping the time stamp of the sample to a time index of the reference signal, the time index linked to the at least one frequency of the reference signal.

27. The method of claim 26, wherein the detecting comprises:

comparing a magnitude of the sample of the multiple samples to the at least one threshold.

28. An apparatus comprising:

a wireless transceiver configured to be connected to one or more antennas, the wireless transceiver comprising:

a mixer configured to be coupled between at least one antenna of the one or more antennas and a modem; and a signal generator comprising:

a selection circuit coupled to the mixer;

a frequency-varying local oscillator coupled to the selection circuit and configured to generate a reference signal for proximity detection at a first time and for jammer detection from another wireless transceiver at a second time; and a local oscillator coupled to the selection circuit and configured to generate a local oscillator signal for wireless communication, wherein the wireless transceiver is configured to adjust processing of the wireless communication based on the jammer detection by generating at least one of a plurality of transmission parameters that control one or more transmission attributes for wireless communication.

29. The apparatus of claim 28, wherein:

the frequency-varying local oscillator is configured to produce a frequency-varying signal; and the wireless transceiver is configured to use the selection circuit to route the frequency-varying signal from the frequency-varying local oscillator to the mixer to provide the frequency-varying signal as the reference signal for jammer detection at the second time.

30. The apparatus of claim 29, wherein:

the frequency-varying local oscillator is configured to produce a frequency-modulated signal; and the wireless transceiver is configured to use the selection circuit to route the frequency-modulated signal from the frequency-varying local oscillator to the mixer to provide the frequency-modulated signal as the reference signal for proximity detection at the first time.

\* \* \* \* \*